US006595781B2

(12) United States Patent
Sutton

(10) Patent No.: US 6,595,781 B2
(45) Date of Patent: Jul. 22, 2003

(54) METHOD AND APPARATUS FOR THE PRODUCTION AND INTEGRATED DELIVERY OF EDUCATIONAL CONTENT IN DIGITAL FORM

(75) Inventor: Sam Sutton, Sedona, AZ (US)

(73) Assignee: Aspen Research, Phoenix, AZ (US)

( * ) Notice: Subject to any disclaimer, the term of this patent is extended or adjusted under 35 U.S.C. 154(b) by 165 days.

(21) Appl. No.: 09/885,661

(22) Filed: Jun. 20, 2001

(65) Prior Publication Data

US 2002/0197593 A1 Dec. 26, 2002

(51) Int. Cl.$^7$ ................................................ G09B 5/00
(52) U.S. Cl. ........................ 434/276; 434/350; 434/362
(58) Field of Search ............................... 434/276, 433, 434/308, 307 R, 315, 350, 365, 362, 118, 151

(56) References Cited

U.S. PATENT DOCUMENTS

| 4,793,813 | A | * | 12/1988 | Bitzer et al. ................. 434/335 |
| 5,711,672 | A | * | 1/1998 | Redford et al. ............ 434/307 R |
| 5,911,582 | A | * | 6/1999 | Redford et al. ............ 434/307 R |
| 5,957,695 | A | * | 9/1999 | Redford et al. ............ 434/307 R |
| 6,210,170 | B1 | * | 4/2001 | Sorensen et al. ............. 434/118 |
| 2002/0058236 | A1 | * | 5/2002 | Zhang ............................ 434/236 |
| 2002/0194309 | A1 | * | 12/2002 | Carter et al. .................. 709/219 |

FOREIGN PATENT DOCUMENTS

| JP | 8-278744 A | * | 10/1996 | ............ G06F/17/00 |

* cited by examiner

*Primary Examiner*—Hieu T. Vo
(74) *Attorney, Agent, or Firm*—Cahill, Sutton & Thomas

(57) ABSTRACT

A computer-implemented method and apparatus are disclosed for use in the capture, compilation, production and delivery of integrated educational and/or training programs in digital form. A wide range of alternative structures and acts are described to illustrate the adaptability of the invention, including a comprehensive disclosure of the prototype system used to create and deliver a fully accredited, four-unit course on the law of Commercial Torts.

31 Claims, 21 Drawing Sheets

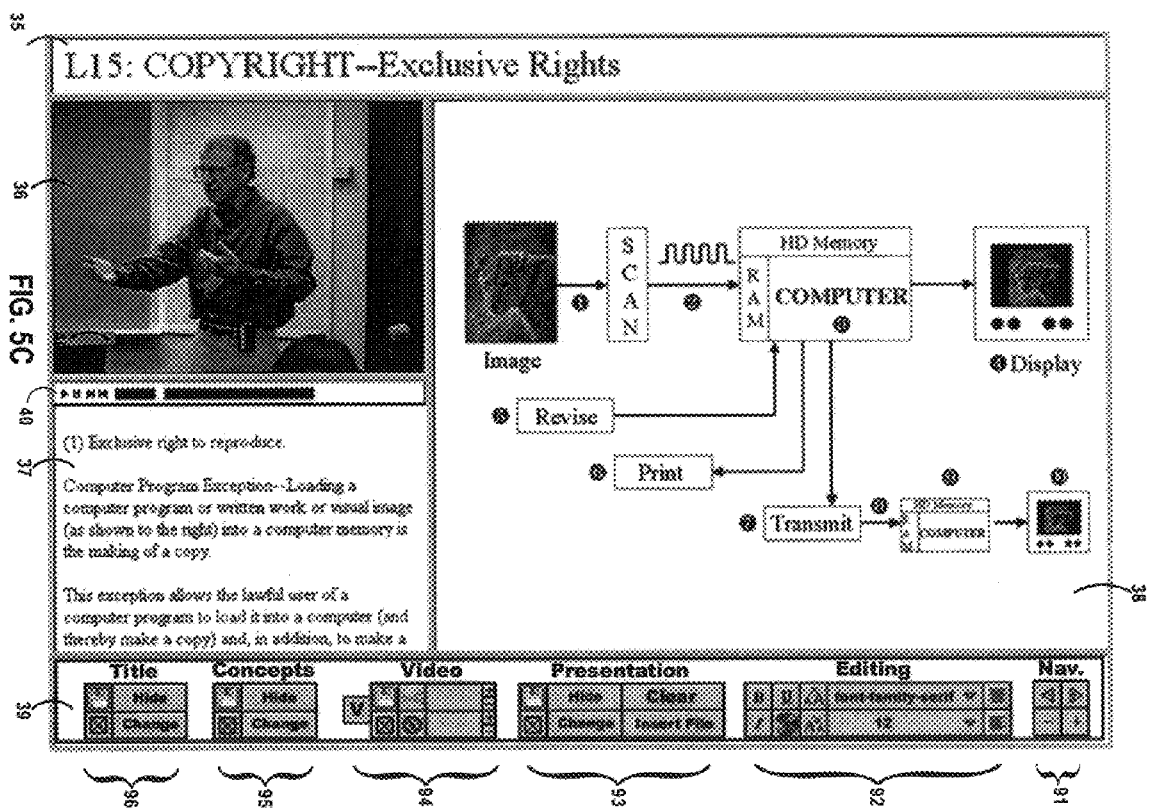

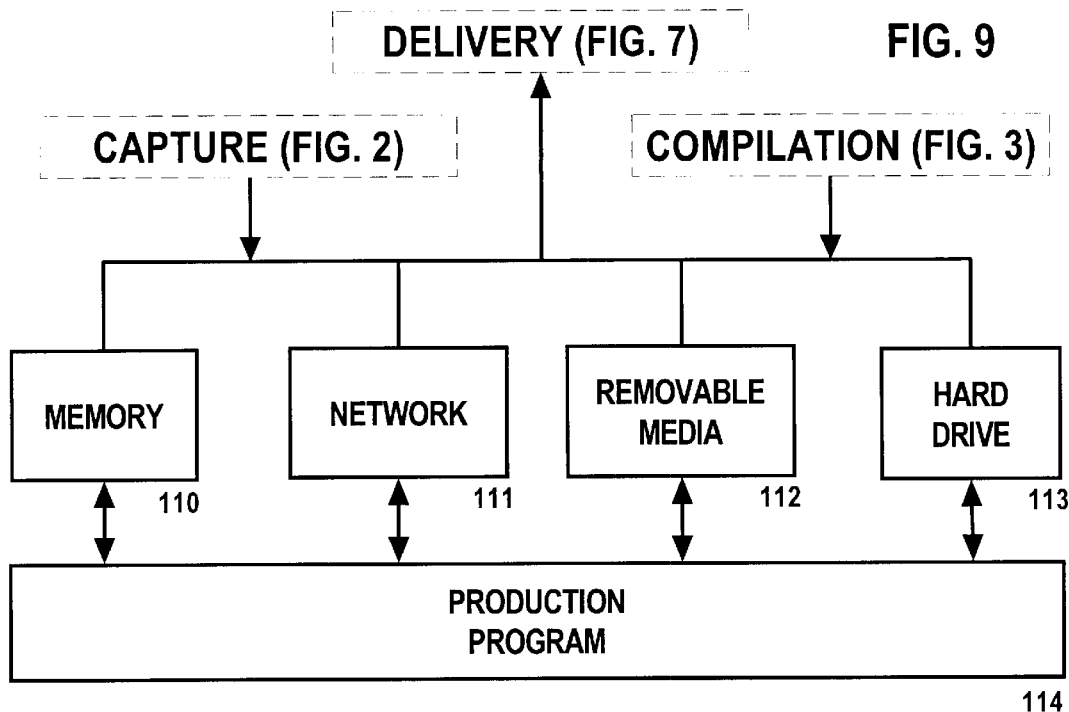

FIG. 9

```
00:00:10.5    PresentationFrame_10.html   PresentationFrame
00:00:10.5    TitleFrame_10.html          TitleFrame
00:00:30.3    ConceptFrame_30.html        ConceptFrame
00:01:00.0    ConceptFrame_60.html        ConceptFrame
00:01:19.8    ConceptFrame_79.html        ConceptFrame
00:01:46.1    ConceptFrame_106.html       ConceptFrame
00:02:26.8    PresentationFrame_146.html  PresentationFrame
00:02:37.8    ConceptFrame_157.html       ConceptFrame
00:02:43.2    ConceptFrame_163.html       ConceptFrame
00:03:24.4    ConceptFrame_204.html       ConceptFrame
00:03:50.8    ConceptFrame_230.html       ConceptFrame
00:04:15.9    PresentationFrame_255.html  PresentationFrame
00:04:34.7    ConceptFrame_274.html       ConceptFrame
00:05:41.9    blank_keyconcepts_pane.html ConceptFrame
00:05:41.9    PresentationFrame_341.html  PresentationFrame
00:05:44.4    ConceptFrame_344.html       ConceptFrame
00:06:06.0    ConceptFrame_365.html       ConceptFrame
```

FIG. 10

FIG. 12B: TortsApp Class Member Data

RandomAccessFile outputFile
Time lastEventTime
String presentationFrameTitle
String videoFrameTitle
String titleFrameTitle
String keyConceptFrameTitle
String blankTitle PaneURLTitle
String blankPresentationPaneURLTitle
String blankKeyConceptsPaneURLTitle
File blankPresentationFile
File blankKeyconceptsFile
File blankTitleFile
int NORMAL
int SHUTDOWN
Thread controller Thread
Int threadState
Hashtable commands
Action actions[]
File lecturePath
File htmlPath
File contentPath
LinkedList fontFamilyList
LinkedList fontSizeList
File dummyGraphicFile
MenuBar menuBar
JMenu fileMemu
JmenuItem openMenuItem
JMenuItem exitMenuItem
JMenu editMenu
JMenuItem cutMenuItem
JMenuItem copyMenuItem
JMenuItem pasteMenuItem
JMenuItem deleteMenuItem
JMenu helpMenu
JMenuItem contentsMenuItem
JMenuItem aboutMenuItem
JEditorPane PresentationPane
JEditorPane TitlePane
JPanel VideoPanel
JEditorPane ConceptsPane
JPanel ButtonPanel
JPanel TitleFrameControlPanel
JLabel TitleActionLabel
JButton TitleAddButton
JButton TitleDeleteButton
JButton TitleHideButton
JButton TitleChangeButton
JPanel ConceptsFrameControlPanel
JLabel ConceptsActionLabel
JButton ConceptsAdd Button JButton ConceptsDeleteButton
JButton ConceptsHideButton
JButton ConceptsChange Button
JPanel VideoFrameControlPanel
JLabel VideoFrameActionsLabel
JButton videoAddButton
JButton videoDeleteButton
JButton StartVideoCutButton
JButton StopVideoCutButton
JTextField VideoCutStartTimeTextField
JTextField VideoCutStopTimeTextField
JButton VideoCutStartTimeUpButton
JButton VideoCutStartTimeDownButton
JButton VideoCutStopTimeUpButton
JButton VideoCutStopTimeDownButton
JPanel PresentationFrameControlPanel
JLabel PresentationActionLabel
JButton PresentationAddButton
JButton PresentationDeleteButton
JButton PresentationHideButton
JButton PresentationInsertContentButton
JButton PresentationChangeButton
JPanel DocumentEditingControlPanel
JLabel DocumentEditingLabel
JToggleButton BoldButton
JToggleButton ItalicButton
JToggleButton UnderlineButton
JButton ColorButton
JButton BiggerTextButton
JButton SmallerTextButton
JToggleButton CenterButton
JToggleButton LeftButton
JComboBox FontFamilyComboBox
JComboBox FontSizeComboBox
JPanel NavigationControlPanel
JLabel NavigationLabel
JButton PreviousEventButton
JButton NextEventButton
String scriptFile
Player myPlayer
Vector eventList
HTMLEditorKit kit
Component visual
Component control
int videoWidth
int videoHeight
int controlHeight
int controlWidth
int insetWidth
int insetHeight

FIG. 12C: TortsApp Class Methods void setupVideoPlayer(File)
void controllerUpdate(ControllerEvent)
void videoPlayerPlay()
void initEditorPanels()
void initComponents()
void PresentationPaneMousePressed(MouseEvent)
void save MenuItemActionPerformed(ActionEvent)
void PresentationChangeButtonActionPerformed(Action Event)
void ConceptsChangeButtonActionPerformed(ActionEvent)
void TitleChangeButtonActionPerformed(ActionEvent)
void videoDeleteButtonActionPerformed(ActionEvent)
void videoAddButtonActionPerformed(ActionEvent)
void VideoCutStopTimeDownButtonActionPerformed(ActionEvent)
void VideoCutStopTimeUpButtonActionPerformed(ActionEvent)
void VideoCutStartTimeDownButtonActionPerformed(Action Event)
void VideoCutStartTimeUpButtonActionPerformed(ActionEvent)
void StopVideoCutButtonActionPerformed(ActionEvent)
void StartVideoCutButtonActionPerformed(ActionEvent)
void FontSizeComboBoxActionPerformed(ActionEvent)
void FontFamilyComboBoxActionPerformed(ActionEvent)
void VideoCutStartTimeTextFieldActionPerformed(ActionEvent)
void ItalicButtonActionPerformed(ActionEvent)
void TitleDeleteButtonActionPerformed(ActionEvent)
void TitleHideButtonActionPerformed(ActionEvent)
void TitleAddButtonActionPerformed(ActionEvent)
void ConceptsDeleteButtonActionPerformed(ActionEvent)
void ConceptsHideButtonActionPerformed(ActionEvent)
void ConceptsAddButtonActionPerformed(ActionEvent)
void PresentationDeleteButtonActionPerformed(ActionEvent)
void PresentationHideButtonActionPerformed(ActionEvent)
void PresentationAddButtonActionPerformed(ActionEvent)
void ColorButtonActionPerformed(ActionEvent)
void PresentationInsertContentButtonActionPerformed(ActionEvent)
void openMenuItemActionPerformed(ActionEvent)
void run()
int deleteEvent (String)
void changeEvent(String)
void addEvent(String,String)
void addEvent(String,double,double)
void updateFrame(eventObject)
void writeEventList()
void initializeScripting()
void flipFrames(double)
void initializeFrames()
double loadEventFile()
void setEditControlStates()
void exitMenuItemActionPerformed(ActionEvent)
void exitForm(WindowEvent)
void streamCopy(FileInputStream,FileOutputStream)
void main(String[])

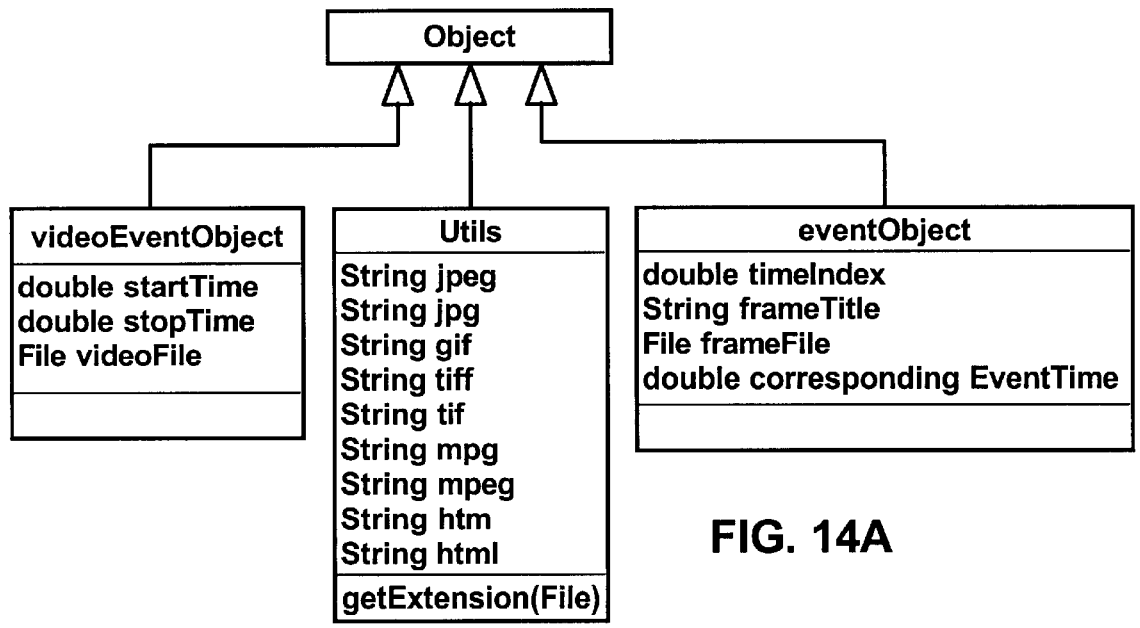
FIG. 14A
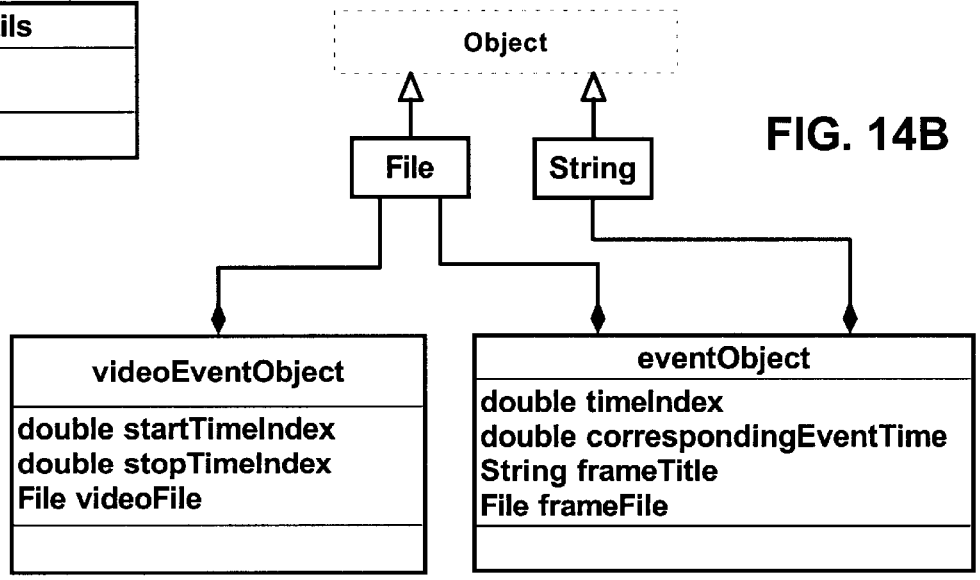
FIG. 14C
FIG. 14B

METHOD AND APPARATUS FOR THE PRODUCTION AND INTEGRATED DELIVERY OF EDUCATIONAL CONTENT IN DIGITAL FORM

BACKGROUND OF THE INVENTION

The present invention relates to computer-based educational technology and, in particular to a method and apparatus for the production and integrated delivery of educational content in digital form.

It has long been the objective of educators and educational technologists to incorporate information processing and communication technologies into the teaching process with a view toward enhancing the transfer of knowledge in terms of both effectiveness and efficiency. Within the classroom, prior teaching technology has ranged: (a) from the use of chalk boards to optical and digital display and projection devices; (b) from the presentation of live lectures to the supplemental use of televised and prerecorded video productions; and, (c) from the use of traditional paper-based texts, treatises, workbooks and tests to computer-based reading, research, exercises and testing.

Particularly in the areas of higher education and specialized training, significant efforts have been directed toward the use of technology in the presentation of courses: (a) that are attended by large numbers of students; (b) that are inherently complex or otherwise benefit from extensive supplementation; or (c) that are presented repeatedly to different individuals or small groups of learners at different times. Also, in the areas of higher and continuing education and in corporate training, substantial efforts have been made toward the decentralization of the teaching process with the objective of making quality education available to more students, at more convenient locations and times, and at a lower incremental cost to the sponsoring organization.

A small minority of academically accredited courses have been offered by means of a videotaped lecture coupled with traditional reading assignments. These courses have had the advantage of allowing students to learn at a time and pace most appropriate to their individual styles and schedules. Videotape has also been used to back up and preserve live educational simulcasts to students enrolled in television-based courses offered on a synchronous or real-time basis. Videotaped lectures make the content available to students unable to attend at specifically scheduled times, and to students unable to learn at the pace adopted by the lecturer. Various combinations of televised simulcasts and videotaped presentations have represented the dominant use of technology in the delivery of traditional higher educational content.

There have been numerous attempts to move toward the asynchronous or time-shifted delivery of educational content in ways that would allow multiple learners to receive the content at virtually any time. Multiple videotape copies of lectures have been made available for viewing by students at any time and this simple methodology has proven to be among the most effective and least expensive. Unfortunately, this requires the production of large numbers of videotape copies for shared use by students and even more if every enrolled student is to receive a copy. Videotape copies degrade with repeated use and serial reproduction. In addition, the shared use of videotape copies requires the availability of multiple televisions and videotape players that require ongoing maintenance and are relatively expensive considering that they are used in educational institutions as single-function devices. Further, it is practically impossible to change, edit, supplement or update the educational content stored on multiple videotape copies without re-recording the lecture on each tape copy. Televised lectures are the content and presentation equivalent of videotaped lectures, except they must be offered to students on a synchronous basis. Unless a student makes a video recording of the transmitted lecture (further degrading the quality of any incorporated text or images), it is impossible to start, stop or otherwise control the rate at which the educational content is delivered and the student must "attend" the televised presentation on the precise schedule set by the lecturer or sponsoring institution.

Videotape and television media are acceptable for the delivery of the audio and video components of an educational or training presentation; however, they are generally inadequate for use in conveying related content in the form of textual, graphic, written, interactive or similar materials. For example, when a lecturer provides supplemental content by writing or drawing on a black (or white) board, this content, if it is to be recorded or transmitted at all, must be captured on videotape along with the lecture itself. At best this requires means for zooming in on the lecturer's writing and produces an image that is low in quality and often hidden from immediate view by the lecturer's hand. In any case, the resulting image produced through non-digital video recordation or television transmission is significantly degraded because of the inherently low-density visual character of these media.

Currently available methods for dealing with the foregoing problem have included the use of two video cameras. In one case a first camera is dedicated to capturing the actions, words and expressions of the lecturer while a second camera is focused close-in on the lecturer's writings and serves to separately record these exemplifications of the lecture content. This methodology has a number of disadvantages. One involves problems in providing reliable synchronization of the two video cameras during play-back and another involves the allocation of screen resources between the lecture—which is continuous—and the lecturer's written notations that are entered on a sporadic basis. These problems have been addressed through the post-production processing of the two videotapes to create a single continuous tape into which relevant segments from the second camera (focused on written entries) are incorporated at appropriate times as inserts into the lecture tape. In some cases, the lecture video is run on a split screen or the written entries are shown full screen while the lecture proceeds on an audio only (or voice-over) basis. While these post-production effort results in an improved simulation of an actual in-class experience, the recorded or televised quality of the written entries is often so low as to accommodate only relatively large format (low-content) entries and images without significant visual or textual detail.

Sophisticated systems (e.g., Media100) are available for use in producing and editing video lectures but their cost, limited availability and complexity of use have placed them beyond the realm of practical adoption by most teachers, professors and trainers. In addition, the inherent low-density character of analogue video recording and playback systems has limited the ability to incorporate educationally meaningful text and graphic materials into lectures presented on videotape.

The visualization problem caused by a lecturer's hand being disposed between a second video camera and the board on which written entries are being made has been addressed by a number of products. One hardware/software package known as the "Educart" (by Tegrity, Inc of San Jose, Calif.) involves a relatively complex, two-camera optical system described in part in U.S. Pat. No. 5,528,263. This and similar products recently on the market are typically used to record short training segments which are augmented by standard Power Point (by Microsoft, Inc.) or similar slide presentations that are prepared prior to the actual lecture. These presentation slides are often used by the lecturer as a prompt (or outline) of the content to be presented. While these slides also provide the audience with an outline of the presentation content, they typically do not educationally supplement the content except by illustrating it's structure and order. Other currently available products for combining videos with Power Point or similar slide presentations are marketed under the names "Real Slide Show", Real Presenter" and "Real Producer" offered by RealNetworks, Inc. These products include an audio and video compression system that allows for replay over intermediate speed network connections.

Another method currently in use combines the video taped image of a lecturer making an informational presentation with an inserted transcription of the lecturer's spoken words displayed to the viewer on a paragraph-by-paragraph basis during play back, rather than in in short, segmented versions as seen in the case of close captioned broadcasts and translated video presentations. This form of verbatim textual supplementation provides no educational or content enhancement beyond what is offered in the lecture itself. Another method, which actually constitutes prior art, incorporates a still image of a lecturer together with a voice-over commentary relating to the educational content presented on the screen observed by the learner. One version of this method is described and illustrated in U.S. Pat. No. 5,433,614.

While the current efforts to develop and deliver "distance education" on an asynchronous basis do provide some approximation of a face-to-face teaching experience, they do virtually nothing to enable the enhancement of that experience from an educational perspective; nor do they meaningfully enable the efficient integration of illustrative, explanatory, analytical, experimental, testing or other supplemental content which substantively expands and enriches the learning experience.

Major efforts are currently underway to further develop and expand broadband systems for the delivery of digitized video on a "streaming" basis to multiple students with access to high speed Internet or Intranet connections. While these efforts have resulted in a highly developed infrastructure for the asynchronous and on-demand delivery of audio/visual works (primarily entertainment), this delivery infrastructure itself can do nothing to develop or enhance the transmitted content.

Current and planned uses of streaming video in higher education and specialized training involve little more than the digitization of video lectures for later viewing. This has been done on the same basis previously described. One sophisticated research institution is in the process of spending tens of millions of dollars to implement this model by constructing specialty lecture halls and related student viewing facilities to annually present, record and re-record lectures for real time or delayed viewing by enrolled students. Such enhanced delivery systems do (at a very substantial cost) eliminate the need for the distribution of videotape copies or the use of television transmission facilities. This improved mode of delivery also enables reception of educational content (by streaming video) on personal computers, rather than televisions or video cassette players. Unfortunately, it does nothing to enable the enhancement of the educational program content beyond the classroom lecture itself.

The principal objective of the present invention is to enable the efficient and inexpensive production and delivery of substantively enhanced educational programs, which incorporate and are built upon traditional high-content lecture presentations or training demonstrations. It is also an objective to provide a simple, technology-implemented system that can be easily used by lecturers, teachers and trainers without on-going aid from a computer or software specialist. Further objectives include the provision of a method and apparatus that will enable: (a) the simple incorporation of a wide range of audio, video, textual, graphic, written, testing, experimental and automated content (all in digital form) into the program to meaningfully illustrate, exemplify, supplement, demonstrate or test understanding of the educational content; (b) the ability to deliver the educational program asynchronously to large numbers of enrolled students by means of network connections or encrypted/activated CDs or DVDs; (c) the convenient updating and revision of the lecture and supplemental content incorporated into the educational presentation for immediate release to students; (d) the on-screen display of individual student notes which can be stored or transmitted at the end of each program session; (e) the incorporation of testing, evaluation, demonstrative and interactive components at predetermined points during the educational program; and, (f) the utilization of proven educational materials and techniques which cannot conveniently or efficiency be incorporated into a traditional live or video-recorded lecture presentation.

The present invention is the culmination of over twelve years of research, testing and statistical analysis of educational materials technology-enhanced teaching methodologies. The embodiment of the invention as described herein was and tested through the development and delivery of a fully accredited four-unit course entitled "Commercial Torts." This course had an enrollment of fifty-seven law students and was presented at the Arizona State University College of Law during the Fall Term (August–December) of the year 2000. The presentation of this prototype course served to demonstrate the invention's functionality, ease of use, stability, adaptability and, most importantly, its effectiveness in achieving the improved and efficient transfer of complex functional knowledge to a group of critical and mature learners who expressed a significant level of satisfaction with the new learning process itself. Eighty-four percent of students who took the prototype on-line course expressed a preference for this method as compared to a traditional live lecture. This group of 57 students achieved an eight percent higher median level of academic performance as measured by a standardized (30 page, 625 point, 4 hour) examination when compared to an earlier group of 70 students who attended the identical lecture at the time it was delivered live.

SUMMARY OF THE INVENTION

The key aspects of the invention may be most effectively summarized in terms of the technical methodology by which the apparatus operates in the production, modification and delivery of an educational program in digital form. In this context, the following provides an overview and summary of the steps included in the improved method and its related features:

(a) Capture Educational Presentation—Capturing and storing as digital performance files the sounds, actions and events produced by at least one person involved in the rendition of an educational or training presentation over one or more periods of time;

(b) Compile Content Files—Compiling and storing as digital content files a plurality of informational expressions related in subject matter to defined time segments of said educational presentation;

(c) Generate Multi-Frame Screen—Generating a screen having multiple predetermined and functionally independent frames including (i) a first frame for receiving and displaying selected time-based performance files depicting the educational presentation and (ii) supplemental frames for independently receiving and displaying selected content files in a defined order and in defined synchronization relative to the time-based display of said educational presentation in said first frame;

(d) Integrate Content—Displaying at least one performance file within said first frame while entering selected content files (in the defined order and synchronization) for display within selected supplemental frames of the screen;

(e) Generate Script—Generating and storing as digitally readable script files, time-based records of when each content file is displayed in each supplemental frame in chronological relation to the time-based display of at least one performance file in said first frame;

(f) Preview Content—Optionally repeating all or portions of step (d) in sequential response to the digitally readable script files to preview the educational program in the form produced for synchronized delivery to users;

(g) Deliver Content—Repeating all or portions of step (d) in sequential response to the digitally readable script files and in controlled response to a set of predetermined commands from at least one independent user viewing said frames and their content within a separately generated screen;

(h) Display User Notes—Optionally displaying individual content in an additional frame within said screen as the content is generated by an independent user during a repetition of step (d);

(i) Modify Content—Optionally repeating steps (d) and (e) while inserting, deleting or changing selected performance or content files and generating corresponding script files for use in incorporating such modifications into the educational program for subsequent delivery to users.

BRIEF DESCRIPTION OF THE DRAWINGS

FIG. 5C is an enlarged view of FIG. 5B with visual and textual content displayed in three additional frames. FIG. 5C also shows an enhanced version of the actual multi-frame screen and control panel used in production of the prototype educational presentation.

FIG. 9 shows the basic functional elements involved in the production process depicted in the flow chart of FIG. 6 and their relation to the delivery elements of FIG. 7.

FIG. 10 shows an initial excerpt from a machine-readable script generated during execution of the production phase of the invention.

FIG. 14 collectively provide a written description in diagrammatic form of the inheritances, dependencies and interrelationships of the event Object class.

BRIEF DESCRIPTION OF THE APPENDICES

Appendix A, filed herewith and consisting of 17 typed pages consecutively numbered A1 through A17, includes illustrative portions of the source code produced for implementation of the prototype system described above. Portions of Appendix A will be referred to using the citation form "A:1X", where "A" refers to the Appendix and "1X" refers to Section 1, Part X. Appendix A is incorporated by reference as a part of the specification.

Appendix B filed herewith comprises a standard compact disc (CD) that includes the executable code used to produce and deliver the prototype course described. Appendix B includes six folders: (1) A folder entitled "Lecture Maker" (including two subfolders "bin" and "src") that contains the code which cooperates with the Java Media Foundation (JMF) in the production of multi-media educational presentations in accord with the present invention. (2) A folder entitled "jmf-2_1_1-win.exe (including multiple subfolders) that contain the Java Media Foundation. (3) A folder entitled "j2sdk-1_3_1-win.exe" (including multiple subfolders) that contains the Java Development Kit (JDK). (4) A folder entitled "Client" (including sub-folders "bin" and "src") that contains the code for displaying a completed educational program on an end user on a client computer. (5) A folder entitled "Sample Presentation" (including content, html, TBDM and script files) that includes a very short (15 seconds) demonstration of a simple multi-media presentation created and structured for delivery in accord with the present invention. (6) A folder entitled "Instructions" that explains how to install and run the production (Lecture Maker") and delivery ("Client") applications. Appendix B, comprising approximately 38 MB, is incorporated herein by reference.

DETAILED DESCRIPTION

Figure 1:
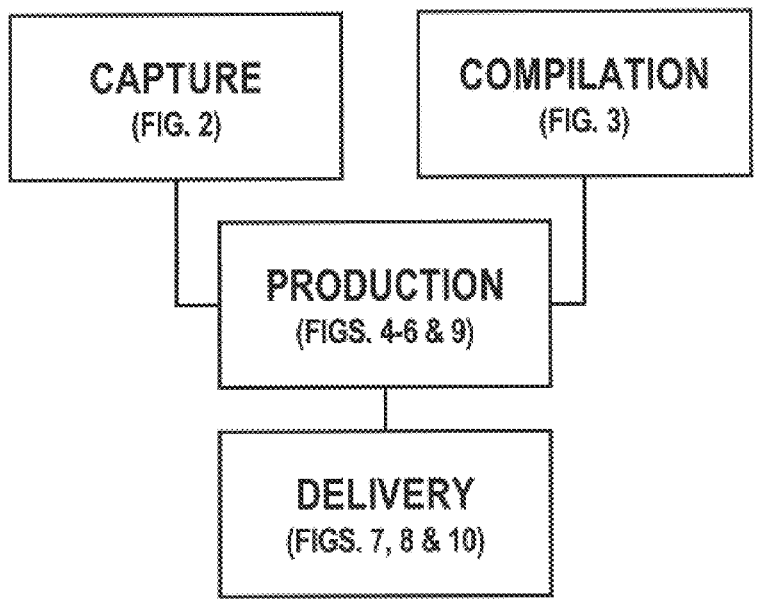
FIG. 1 is a high-level flow chart depicting the functional interrelation of the capture, compilation, production and delivery aspects of the invention as further described in relation to FIGS. 2–10.

FIG. 1 presents a high-level overview of the production and delivery of an educational program made in accord with the present invention. Further description of each aspect of the invention is provided in conjunction with FIGS. 2–10 as referenced in the functional boxes of FIG. 1. Educational content, in the form of audio, video, graphics, text and other forms of expression are developed in the course of (a) the capture process depicted and further described in conjunction with FIG. 2 and (b) the compilation process depicted and further described in conjunction with FIG. 3. During the production process described in relation to FIG. 4, recorded and compiled content is digitally integrated for presentation within a multi-frame screen of the type generally shown and described in conjunction with FIGS. 5 and 8. Finally, the integrated content is asynchronously delivered to multiple students by the delivery method and apparatus described in relation to FIGS. 7–10. FIGS. 11–17 with the associated text illustrate and describe the Java-based software used to implant the invention as used in the production and delivery of the prototype course. Appendix B, attached and incorporated herein by reference, is a CD containing the basic source code and executable programs used in production and delivery of the prototype course.

Figure 2:
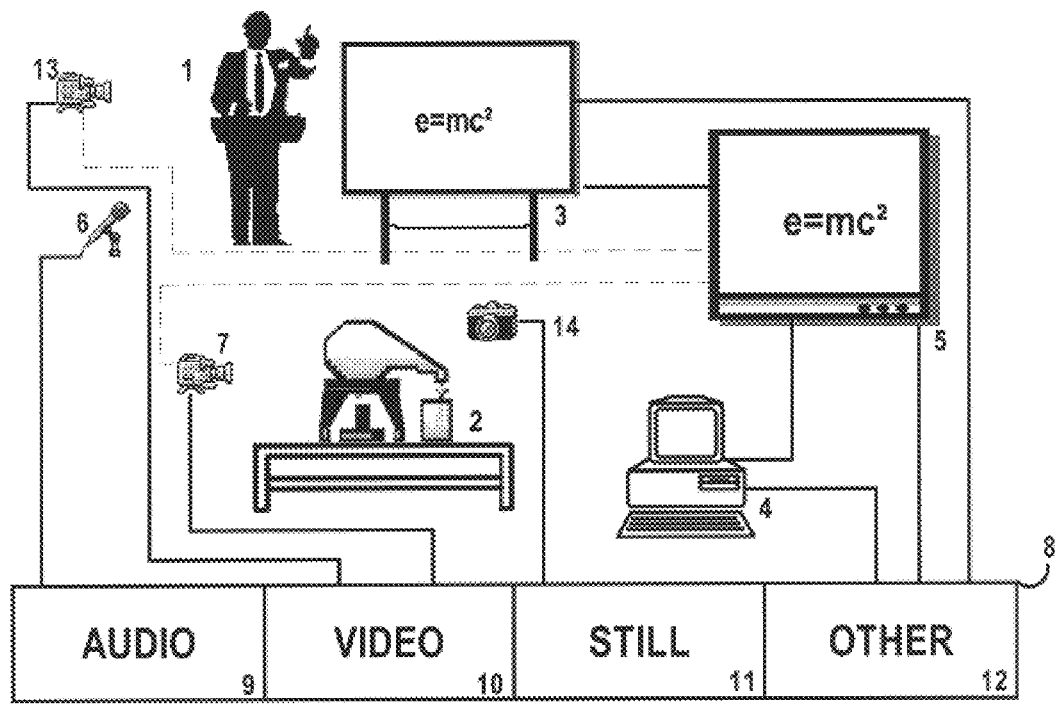
FIG. 2 shows some of the elements that may be used during capture to collect and digitally store an educational presentation, together with any concurrently generated enhancements.

FIG. 2 shows a number of representative elements that may be optionally incorporated into either a traditional or technologically-augmented educational presentation. The presentation may be made in classroom, large lecture hall, office or recording studio. The elements depicted in FIG. 2 have the common purpose of capturing and/or storing various components of the educational content as it is presented. The movements and expressions of presenter 1 are captured by one or more of video cameras 7, 13 and microphones 6. The outputs from these devices are stored in the storage device generally indicated as 8 in either an audio partition 9 or a video partition 10. If video camera 13 produces an analog output, the video partition 10 may consist of one or more tracks of magnetic tape. Alternatively, the analog output may be first digitized and stored as digital data in video partition 10. If video camera 13 produces a direct digital output, the video partition 10 may consist of any standard means of storing digital video data, such as a digital videotape, disk or other form of a computer-readable memory. Obviously, audio and video outputs may be stored within a single storage medium. However, in a preferred embodiment, audio and video signals are stored separately or on separate tracks so that they can be independently edited in the production and updating process described below in conjunction with FIG. 4.

Presenter 1's voice is captured by microphone 6. Microphone 6 may be either an analog or digital device whose output is stored in audio partition 9 which may consist, for example, of one or more tracks of a magnetic tape, a digital audiotape, disk or other forms of computer-readable memory. The outputs from video camera 13 and microphone 6 will normally be stored in a time-based or synchronous fashion to assure that the video and audio elements will properly track one another when they are played back.

Presenter 1 (or an assistant) may optionally conduct a demonstration or discuss experiment such as is generally shown on table 2. A demonstration may be videotaped by camera 7 and selected portions may be recorded photographically by means of still-camera 14. Presenter 1 may also convey information by means of notes, equations, sketches or other material written on an electronic drawing tablet or digitizing board 3. In addition, computer 4 may be used to present a wide range of static or dynamic content. A large display screen 5 may be used to better convey the educational content from any of the input devices (including the digitizing board 3, computer 4, video cameras 7 and 13, or still camera 14) to those in attendance at the live presentation. The use of the display screen 5 may be particularly important in large lecture halls where students are seated some distance from the presentation.

The storage device(s), generally indicated as 8, receives and stores content from any of the input devices including digitizing board 3, computer 4, video cameras 6 or 7, microphone 13 or still camera 14. These inputs are preferably the direct digital outputs produced by each of the devices but they initially may be in either analog or digital formats. If the inputs are analog they may be stored as analog data; or, they may be digitized before they are stored. If the inputs are analog and they are not digitized (by well-known means) at this stage they must be digitized at some point before being utilized in the production system described below in conjunction with FIG. 4.

The experiment or demonstration shown on table 2 may be captured by either video camera 7 or, preferably, by a second video camera 14. The resulting output from video camera 7 is separately stored within the video partition 10 of storage device 8 in the same time-based manner described in conjunction with video camera 13. The still camera 14 may be used to capture selected portions of the experiment or demonstration presented on table 2, producing either an analog or digital output which is stored in the still partition 11 of storage device 8. Partition 11 may consist of, for example, of one or more frames of exposed chemical film, a flash memory card or a computer disk. Chemical film will ultimately be developed and digitized (e.g. scanned) for storage as digital data within the still partition 11. The outputs from video camera 7, still camera 14, digitizing board 3 and computer 4 are stored in storage device 8 on a clocked basis preferably in time synchronization with the outputs from video camera 6, and/or microphone 13. While video camera 13 and microphone 6 will normally be recording presenter 1 on a continuous basis, the other input devices shown in FIG. 2 will be activated (and their outputs stored) only during selected periods during the educational presentation. Synchronization of these stored inputs may be achieved, for example, through the use of a common clock in the production of a sequential log of input events and times for use in resynchronization during production and/or playback as further described below. Alternatively, resynchronization may be manually achieved during the production process described in conjunction with FIG. 4.

The digital display output from computer 4 may be transferred to display screen 5 to make the associated content visible to those attending the live educational presentation. Alternatively, or in addition, the output of computer 4 may be stored within a separate partition 12 of storage device 8. The output from the computer 4 may consist of, for example, video files, audio files, image files, text, animation, or simulation files. The output from computer 4 may also consist of files generated by presentation, testing or evaluation software or any other digital content that serves to enhance, explain or supplement the educational presentation. Generally this information will be stored in the same non-continuous but time based or synchronous manner previously described. Alternatively, this computer-generated content may be resynchronized with the educational presentation during the production phase described in relation to FIG. 4.

As suggested by the two dashed lines running from video cameras 7 and 13 in FIG. 2, the large screen 5 may also be used to display digital outputs from other digital input devices, thereby enhancing visibility for persons attending the live educational presentation. One or more such outputs may be simultaneously displayed on all or part of screen 5. Preferably, when digital content is displayed on screen 5 it will be concurrently stored within partition 12 of storage device 8 so that it is later available for use during the production process.

The electronic drawing tablet or digitizing board 3 may be a large, wall-mounted unit or a smaller tablet-sized unit placed on a podium, table or desktop. Alternatively, it may be a smaller, hand-held unit. During the educational program, presenter 1 may manually enter information such as notes, equations, sketches, diagrams or other written material on digitizing board 3. Such information will normally be digitized during entry and ultimately stored in a separate partition 12 of storage device 8. Preferably, this content will be stored on the same non-continuous but synchronous basis previously described, or it may be resynchronized to the other outputs during the production process.

The foregoing description of FIG. 2 is intended to illustrate some of the input devices that can be used to capture different aspects of the educational content presented, while digitally storing this content for later selective use in the production of an integrated digital program that includes post-presentation additions, modifications and deletions as may be appropriate to provide a maximally efficient and effective learning experience for those who undertake the educational program at a later time.

Figure 3:
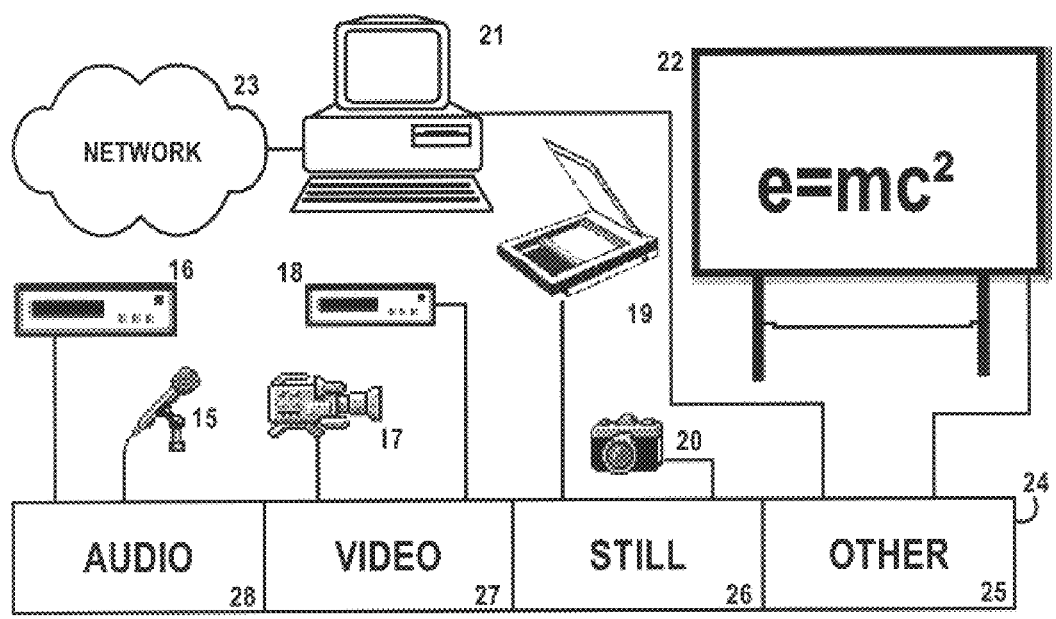
FIG. 3 shows some of the elements that may be used during compilation to create, capture and digitally compile supplemental educational materials for presentation in the course of an educational presentation.

FIG. 3 illustrates a few of the many input devices that may be used to provide additional or supplemental content for incorporation into an educational program made in accord with the present invention. The location, selection and compilation of supplemental content may be carried out by presenter 1 or by other content experts responsible for acquiring, formatting or combining a variety of additional content not captured, available, known or even contemplated at the time of the live educational presentation illustrated in FIG. 2. This process of compilation may occur before, during or after the capture of the live presentation.

The compiled content is selected to illustrate, explain, supplement, synthesize or enhance the educational presentation captured by the elements shown in FIG. 2. This supplemental content may include the outputs from a variety of devices such as microphone 15, audio reproduction device 16, video camera 17, video reproduction device 18, scanner 19, still camera 20, digitizing board 22, or computer 21. In addition, computer 21 may be connected to other sources via network 23. Supplements are preferably compiled in digital format but may be initially analog, so long as they are digitized before they are incorporated into the final educational program. The storage device indicated generally by reference numeral 24 receives and stores supplemental digital content derived from any of the input devices shown in FIG. 3.

An educational presentation (shown during capture in FIG. 2) may be subsequently enhanced through the addition of audio supplements. In FIG. 3 microphone 15 and audio reproduction device 16 function to compile audio supplements for incorporation into the educational presentation. Audio supplements may include live or prerecorded speech, music, sound effects or voice-over edits of the lecture by presenter 1 (in FIG. 2).

An educational presentation may also be enhanced through the incorporation of content-related video supplements. In FIG. 3, video camera 17 and video reproduction device 18 may be used in compiling these video supplements for storage in the video partition 27 of storage device 24. Video or audio-video supplements may include video clips of experiments, demonstrations, interviews or performances that relate to the content of the main presentation.

Visual images and graphics can also be used to enhance an educational presentation such as the one shown during capture in FIG. 2. In FIG. 3, scanner 19, camera 20 and computer 21 facilitate the creation, collection and compilation of such images. These images, ultimately stored in digital form within still partition 26, may consist of photographs, diagrams, drawings, tables, charts or other graphical forms of visual expression.

In addition, computer 21 may be used to create, edit and compile supplemental content in static or dynamic digital formats. Such supplements may take the form of digital audio clips, video clips, still images, animations, simulations, text, tables, graphs, charts, diagrams or any other form of digital content that might serve to illustrate, supplement, explain or enhance the main educational presentation. Computer 21 may be optionally connected to network 23 through which supplemental educational content may be retrieved. The supplemental content compiled by means of computer 21 may be stored in partition 25 of device 24 which may itself be an integral part of the hard drive in computer 21.

The electronic drawing tablet or digitizing board 22 may be a large, wall-mounted unit or a smaller tablet-sized unit placed on a podium, table or desktop. The digitizing board 22 may be used during post-production to enter and display notes, equations, sketches, diagrams or other written content to be stored in partition 25 of storage device 24, for later use in production of a finished educational program.

FIG. 3 is intended to illustrate some of the different means that can be used to create, capture or compile digital content for use in supplementing the educational presentation of FIG. 2. This supplemental content is digitally stored for later use in producing an enhanced educational program created by synchronously integrating the captured educational presentation of FIG. 2 and the compiled supplemental content of FIG. 3. This is accomplished by means of the production system that will now be described in conjunction with FIG. 4.

Figure 4:
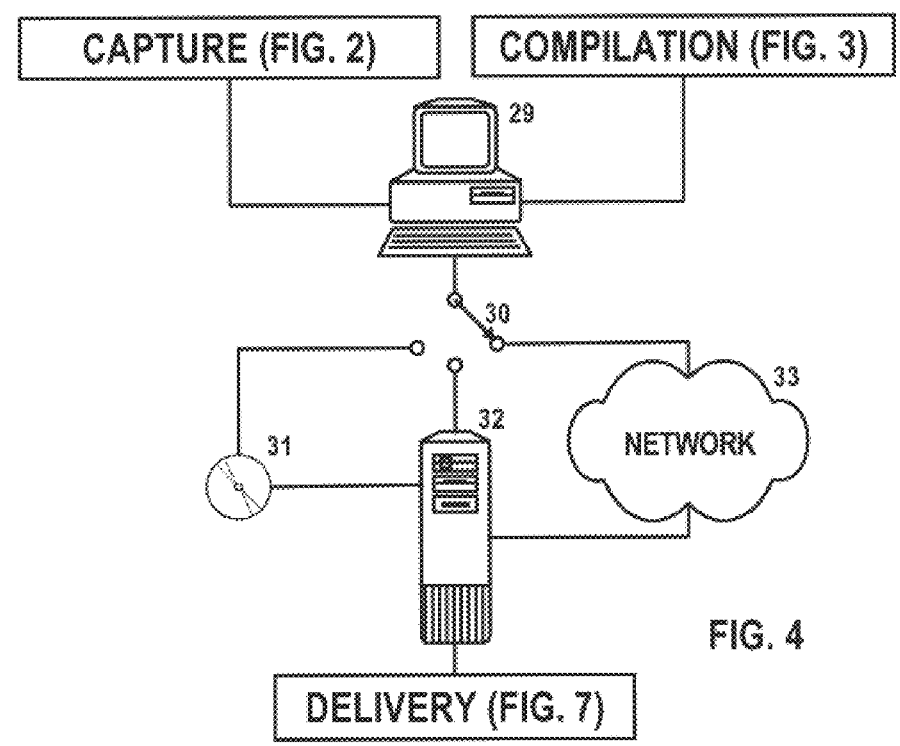
FIG. 4 shows basic (and alternative) elements for integrating the digital content captured during an educational presentation with supplemental content to produce a finished educational program for subsequent delivery to an end user's computer, directly, by transportable media or over a digital network.

FIG. 4 provides an overview of the basic apparatus used to implement a production system for the integration of (a) digital content stored from the capture elements of FIG. 2 and (b) digital content stored from the compilation elements of FIG. 3 to form a unified educational program for later distribution to end users by the delivery system described in conjunction with FIG. 7.

Referring to FIG. 4, the production system includes a programmed, general purpose digital computer 29 providing the functionality that will be described in conjunction with FIG. 6. The programmed computer 29 allows the user to synchronously integrate the captured digital content of FIG. 2 with the compiled digital content of FIG. 3 to produce a unified educational program for presentation within a multi-frame screen such as the one shown in FIG. 8A. The contents of storage device 8 in FIG. 2 and storage device 24 in FIG. 3 may be transferred for storage on the hard drive of computer 29 or this content may be remotely accessed by computer 29. In one embodiment, a finished educational program may be transferred for storage on a production server 32 and later transferred to a program delivery system as described in conjunction with FIG. 7. Alternatively the finished educational program may be transferred directly to the delivery server 54 shown in FIG. 7.

In FIG. 4, the selector 30 suggests the alternative means by which a finished educational program may be transferred from production computer 29 to production server 32 or directly to the delivery server 54. Indeed, servers 32 and 54 may be a single device. In the leftmost position, selector 30 indicates a physical transfer of the finished program by means of removable media 31 which may be a magnetic tape, CD, DVD or any equivalent digital recording media. The central position of selector 30 suggests that server 32 (or server 54) is either integral with computer 29 or is connected to computer 29 for direct wire communication. In the rightmost position, selector 30 suggests that the finished educational program may be transferred through a network 33. The center and rightmost options of selector 30 allow for bi-directional communication with computer 29, allowing the a educational program to be regularly updated and edited to provide the end user with the most current educational content. Thus, the educational program may be produced on computer 29 and delivered from either computer 29 (when configured as a server) or from either production server 32 or delivery server 54. Alternatively, computer 29 may be used to produce removable media 31 (or 53 in FIG. 7) which can be distributed to end-users for playback on computer 54 (FIG. 7).

Figure 7:
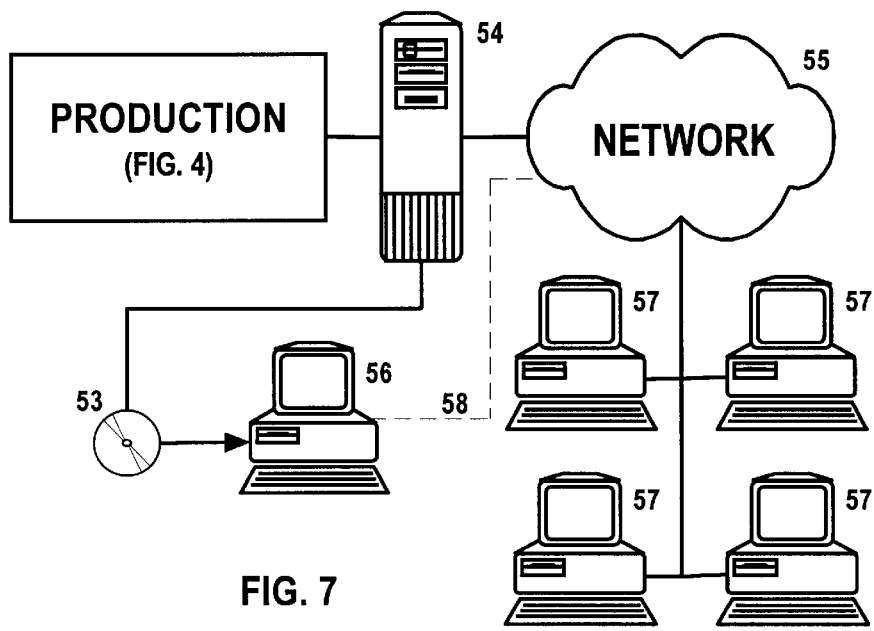
FIG. 7 depicts alternative ways to deliver a finished educational program from a server to an end user's computer, either directly, through a network or by means of transportable media such as a CD.

FIG. 7 further illustrates some of the alternatives for delivery of a finished educational program to end users at local or remote computers 56 or 57. Alternatives include the use of a separate delivery server 54, removable media 53, network 54 or some combination of these elements.

When removable media 53 is used as a part of the delivery system, media 53 will be used to transfer all or part of the educational program to a user's computer 56. If the educational program is completely contained on removable media 53, computer 56 may be a stand-alone computer or a device that is only capable of reading, processing and displaying the files and any computer code contained on media 53. In the case of high volume educational programs, media 53 may be encrypted or otherwise protected and may require authentication of a user's right to access and view the presentation. Retrieval of a key to decode the encrypted media or bypass other protections will be required in such cases. If present, encryption may be accomplished by any of several well-known methods for encrypting digital information. For example, content files may be encoded using blowfish or a similar encryption algorithm. Video files may be encrypted using the encryption scheme available via Microsoft's Windows Media Encoder. Other forms of technological protection might take the form of a serial number input before the user can begin viewing the educational program. Such serial numbers can be distributed with media 53 in the manner often employed in the distribution of proprietary software. Decryption might require separate authentication in addition to simple entry of a serial number.

Computer 56 may also be connected to network 55 as indicated by the dashed line between these two elements in FIG. 7. Communication between server 54 and computer 56 via network 55 allows for the exchange of authorization, encryption and billing data together with portions of the educational presentation not included on media 53. Where this network connection exists, communications between computer 56 and server 54 may also be encrypted and may be accomplished using any of several commonly employed schemes. For example, a public/private key encryption method could be used.

Where the delivery system of FIG. 7 consists of server 54 connected through a network 55 to computers or network appliances 57, the finished educational program is delivered directly (and preferably asynchronously) to each of the authorized users on the network. In addition to the content of the educational presentation, the server 54 and networked computers 57 may exchange authorization, encryption, billing or other information by any of the well-known public or commercially available schemes.

Where remote computers 57 and server 54 are connected through network 55, a typical delivery begins with the end user accessing one of the educational programs stored on server 54. The user may also be asked to log on using a password and user name known to server 54 or otherwise authenticate themselves by providing other identifying information. The user will typically select from an HTML list of available programs using a web browser such as Microsoft's Internet Explorer or by using custom playback software. After selecting a particular program, the user will be presented with an ornamental multi-frame screen, such as the one shown and described in conjunction with FIG. 8. The selected program will then be displayed within the multi-frame screen.

Where the user's computer 56 receives content from both removable media 53 and network 55, a typical session begins with the end user inserting or otherwise making media 53 directly accessible to computer 56. Media 53 may be encrypted and thus require that the end user at computer 56 enter a password or other identifying information before computer 56 will be allowed to run and display the educational program. Upon authenticating the end user's right to view the requested program, server 54 may then pass a decryption key or other access authorization to computer 56. Either before or after such authentication an ornamental multi-frame screen will be generated on the monitor associated with computer 56. One preferred design for this screen is shown in FIG. 8.

In the prototype course that was first implemented through use of the claimed invention, the presentation content (FIG. 2) was recorded in analog format (including HVHS video) and connected to a compressed MPEG-3 digital format. Supplemental content in the form of diagrams, photographs, graphic images, text, music, video and the like were collected and stored primarily in JPEG, CIR, HTML and MPEG. The finished educational program was transformed from the production computer (equivalent to 29 in FIG. 4) to a delivery screen (equal to server 54 in FIG. 7) from which it was delivered over a university network to 57 enrolled students using remote computers (equivalent to computer 57 in FIG. 7). The educational program consisted of 27 lectures having an average duration of about 83 minutes each and delivered in the format illustrated in FIG. 8 along with hundreds of separate files containing textual, visual and other materials displayed in the title, concept and presentation frames described in conjunction with FIG. 8. The method used to produce this educational program will not be described in reference with FIGS. 5A through 5E.

Production Overview

Figure 5A:
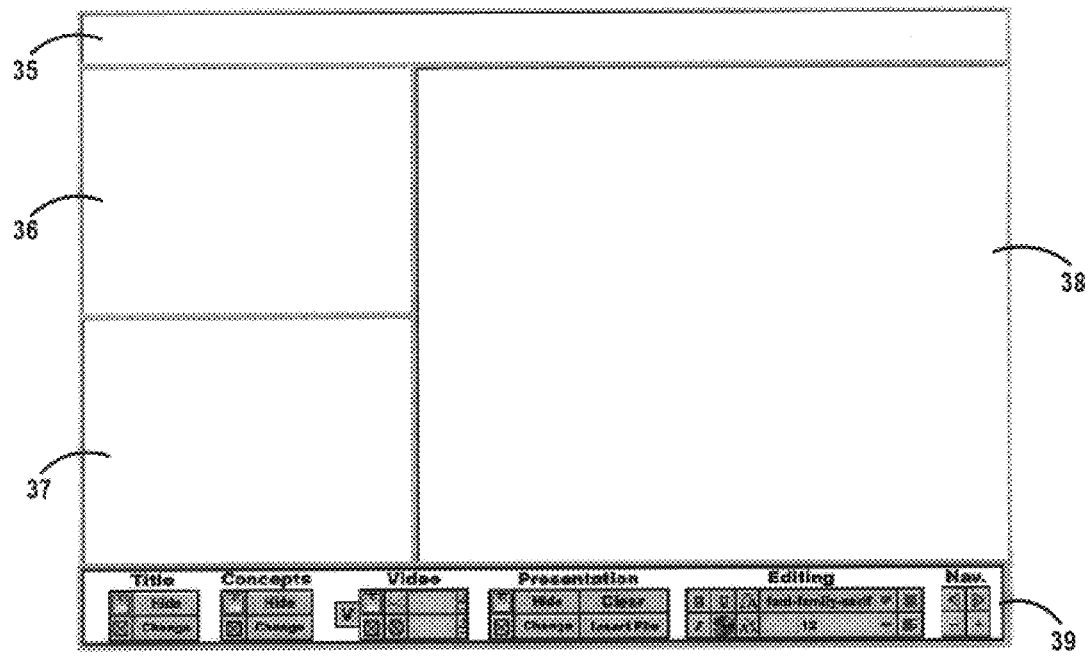
FIG. 5A shows one of many multi-frame screen designs that may be displayed with a digitally generated panel of controls used in providing inputs during production of an educational program.
Figure 6:
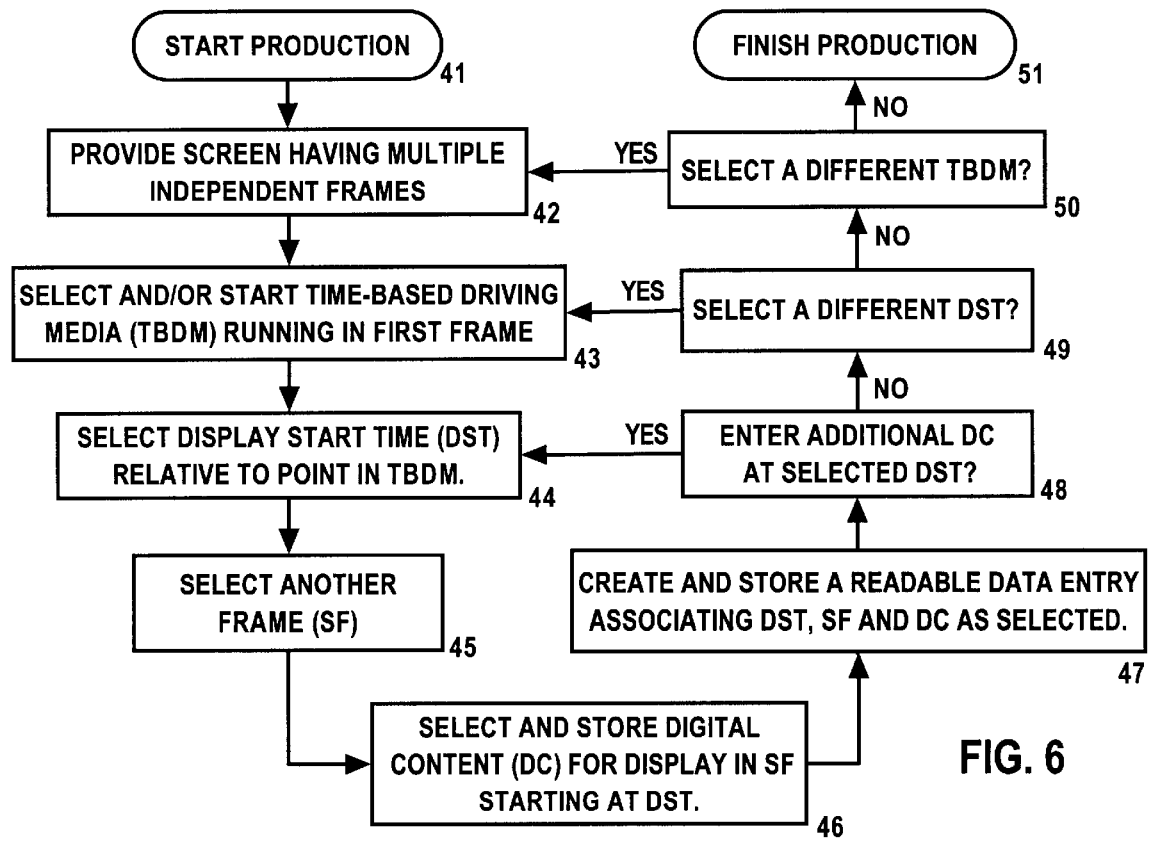
FIG. 6 is a flow chart indicating the initial and optionally repeated sequence and interrelationship of the basic steps included in the production aspect of the invention.

The upper portion of FIG. 5A illustrates one of many different ornamental configurations for a multi-frame screen suitable for use in connection with the production process summarized by the flow chart of FIG. 6. The preferred design of FIG. 5A is presented as viewed by an educational program developer using the computer 29 (FIG. 4 and FIG. 9) to produce an educational program in accord with the present invention. The preferred configuration includes four visually defined frames: a title frame 35, a video frame 36, a concept frame 37, and a presentation frame 38. In addition (but not part of the multi-frame design) is a functional production control panel 39. The multi-frame screen of FIG. 5A and the control panel 39 are generated by production software running on computer 29. The functions and operation of this software will be described in conjunction with the flow chart FIG. 6. The production and delivery software used to produce the prototype educational program on Commercial Torts is included in Appendix B in executable form.

FIG. 6 describes in a flow chart format, the basic functional steps carried out by the apparatus shown in FIG. 4 in the production of an educational program in accord with the present invention. FIG. 6 also discloses the high-level functions executed by the production software installed on production computer 29 and/or production server 32 of FIG. 4.

Typically, before the production functions of FIG. 6 are commenced (with step 41), most if not all of the capture process (FIG. 2) and the compilation process (FIG. 3) will have been completed, subject to later modification and supplementation. Portions of the compilation process (FIG. 3) may be performed during with the production process (FIG. 6). In any case, step 41 is initiated by starting the production software resident on computer 29 (FIG. 4, Appendix A) or by fetching the production software from server 32. This step may require the operator of computer 29 to log into server 32 (FIG. 4) or provide other identifying information to verify the operator's right to use (on server 32) or to download (to computer 29) the production software. If the production software (or any portion of it) must be downloaded, it will be downloaded to memory 110 or hard drive 113 of computer 29 as shown in FIG. 9.

Upon completion of the initiation step 41 (FIG. 6), the production software generates a multi-frame production screen referred to in step 42 of FIG. 6. A preferred ornamental design for this screen is shown in FIG. 5A. The multi-frame screens depicted in progressive stages of development in FIGS. 5A, 5B and 5C was produced by a prototype production system written entirely in the Java2 language developed by Sun Microsystems. This prototype system operated in conjunction with a general purpose computer running the Microsoft Windows 98 operating system, although the Windows 2000 or Windows NT operating systems would perform equally well. Frames 35, 37 and 38 (FIGS. 5A, 5B) are instances of Java2's JEditorPane class configured to display and edit files composed using the Hyper-Text Markup Language (HTML). Video frame 36 is an audiovisual player capable of playing back multimedia files in a variety of formats and was implemented using the Java Media Frameworks (JMF) from Sun Microsystems. The executable (and source) code used to produce the prototype system is disclosed in Appendix B.

Figure 5B:
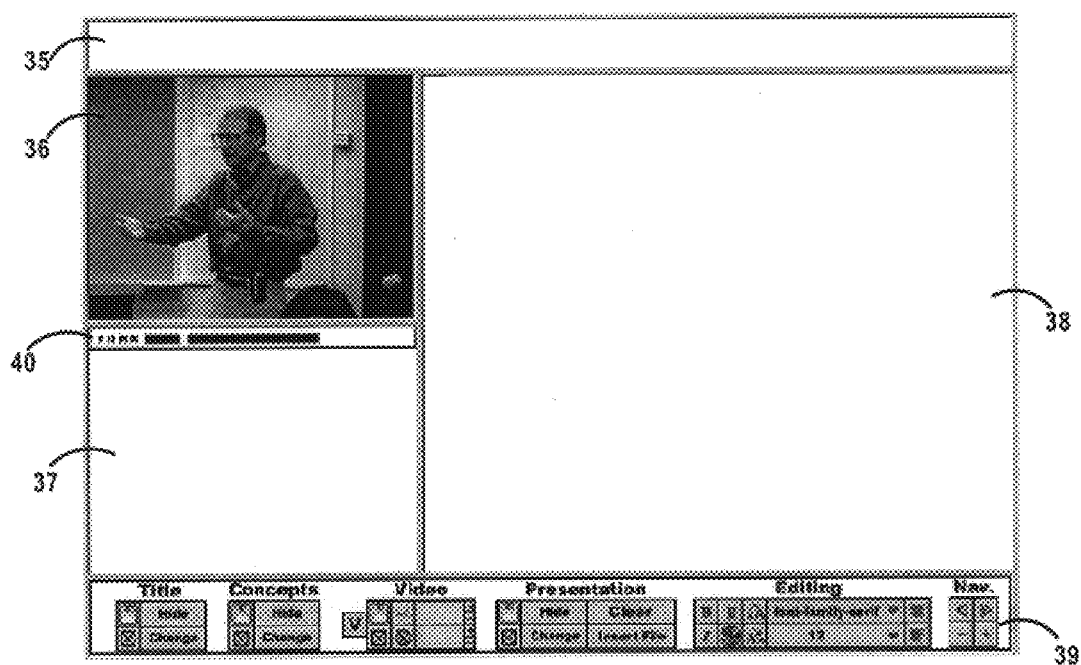
FIG. 5B shows the screen of FIG. 5A within which a time based audiovisual presentation is digitally displayed in a first frame.

Upon being presented with a multi-frame screen the operator producing an educational program selects an initial time-based driving media (TBDM) as indicated in step 43 of FIG. 6. The selected media is stored as an audiovisual file that is compatible with the audiovisual player associated with video frame 36 (FIGS. 5A, 5B). The prototype course that was produced and tested using the invention involved twenty-seven MPEG-1 video files each having average run-times of approximately 83 minutes and a combined audio and video bandwidth of approximately one Megabit per second. The desired video file was selected from the pop-up window shown in Fig. D. After a first TBDM file has been selected and opened, the production program 114 (FIG. 9, Appendix A) displays the first frame of the selected TBDM in video frame 36 of the multi-frame screen (FIG. 5A). The production screen will then appear as generally shown in FIG. 5B, with a standard video control bar 40 allowing the operator to start, stop, pause and increment the video forward or back.

After a TBDM file has been opened in frame 36, the TBDM file is allowed to advance under the operator's control to a particular point in time at which content is to be displayed in one of the other frames. In step 44 of FIG. 6, this point corresponds to the Display Start Time (DST) when digital content from one of the compiled files (FIG. 3) is selected for display in one of the other frames adjacent to the first or video frame 36.

Having determined the DST, the operator uses the production software to carry out step 45 by utilizing an input device (such as a mouse), connected to computer 29, to select one of the frames 35, 37 or 38 to receive digital content (DC). The frame selected in step 45 (FIG. 6) is where digital content (DC) will be displayed after it has been added, modified or deleted in step 46. When a frame has been chosen, the operator will typically observe a blinking cursor in the frame indicating it is the currently selected frame.

Having chosen a TBDM, a DST and a frame into which DC is to be inserted, the operator executes step 46 (FIG. 6.). Using the controls of control panel 39 (FIG. 5), the digital content (DC) is inserted into the selected frame at the chosen DST. The DC may be any form of related content from either the capture process of FIG. 2 or from the compilation process of FIG. 3. Likewise, digital content (DC) may be added to the selected frame via an input device such as a keyboard or mouse connected to computer 29 (FIGS. 4, 9).

Figure 5D:
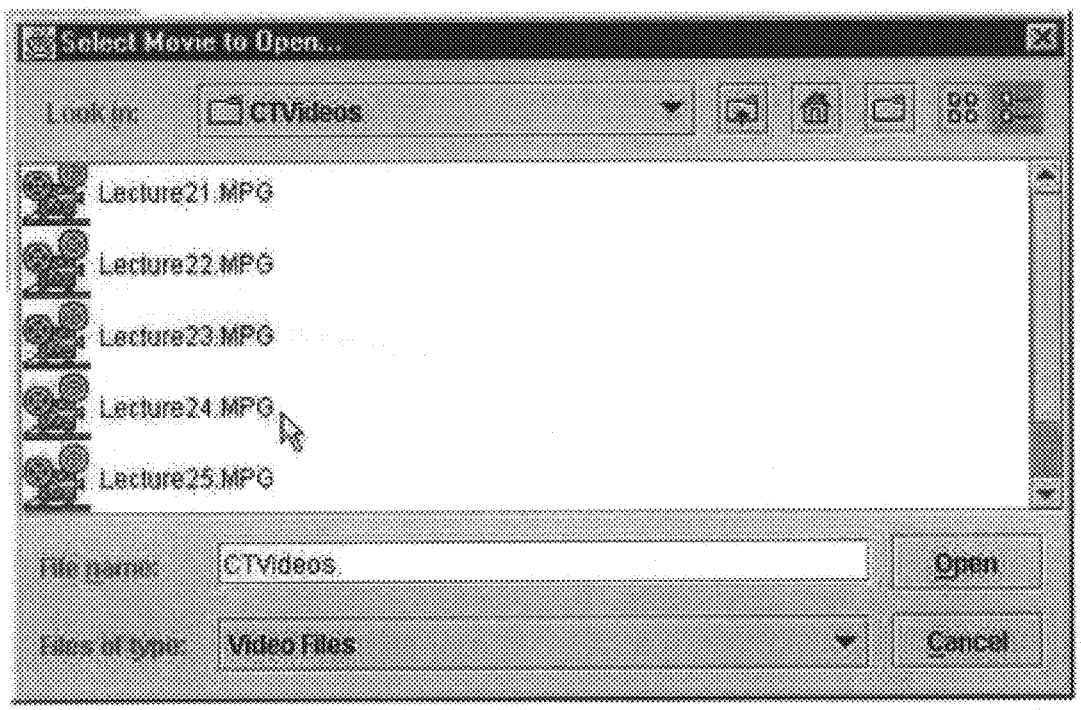
FIG. 5D shows a representative pop-up menu from which a user selects a time-based presentation for display in a first (TBDM) frame as shown in FIG. 5B.
Figure 5E:
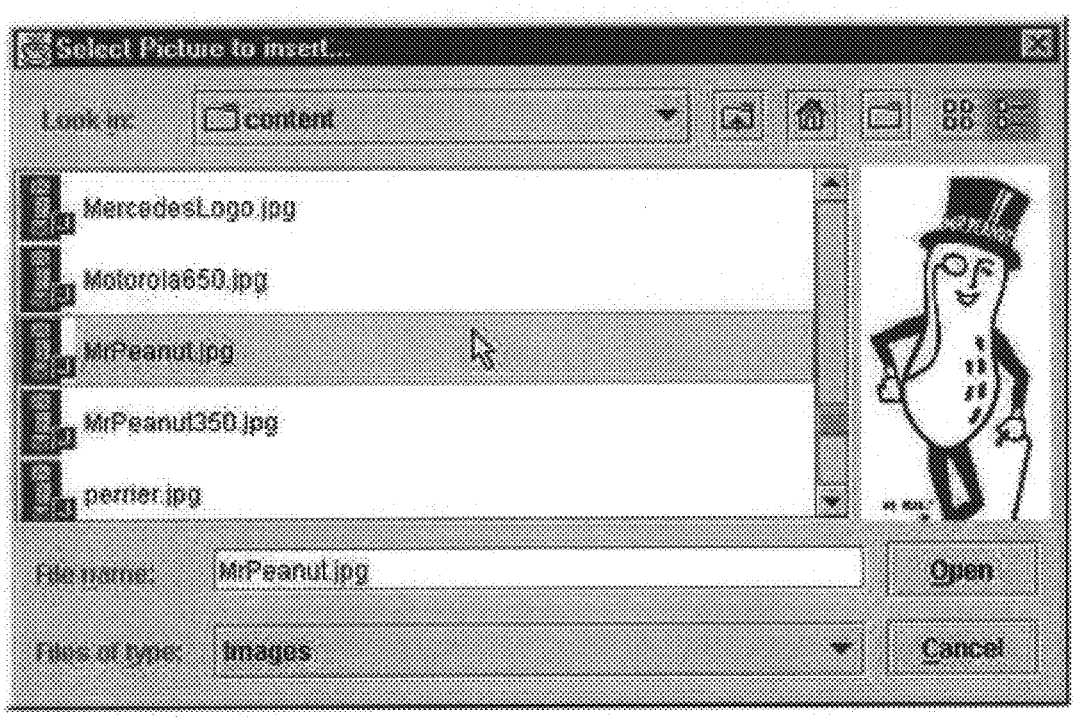
FIG. 5E shows a representatives pop-up menu from which a user can select a file for display in another (e.g. the largest) presentation frame as exemplified by the diagram shown for illustrative purposes in FIG. 5C.

FIGS. 5C and 5E in conjunction with FIG. 6 illustrate the entry, correction and removal of digital content (DC) within presentation frame 38 using the controls 39 (FIG. 5). After the presentation frame 38 is selected, the operator selects DC for entry into frame 38 by clicking the "Insert File" button within control set 93 on control panel 39 as best shown in FIG. 5C. This command calls up a pop-up list of files available for insertion, as shown in FIG. 5E. The operator clicks on (selects) the desired DC files and the selected file is displayed in the selected frame, in this case the presentation frame.

FIG. 5C shows an example in which presentation frame 38 is displaying a selected DC file, in this case the supplemental content is a diagram used to illustrate the subject matter of the lecture content being presented in frame 36. After insertion, the new DC is visible in frame 38 for inspection and approval by the operator but the DC is not yet a fixed part of the educational program. This integration of the chosen DC into the selected frame 38 as a fixed and representative part of the educational program occurs as step 47 (FIG. 6). Using the "Save" button in the upper left portion of control set 93 (FIG. 5C), the operator clicks to fix the current contents of frame 38 as part of the educational program. This action by the operator causes the production program 114 (FIG. 9) to store the DC currently displayed in frame 38 as a separate named file or entry in a database and to concurrently produce a corresponding entry into a digital table or machine-readable script recording for future use: (a) the DST for this DC; (b) the frame in which the DC is to be later displayed; and, (c) the file name or database entry from which the DC may be retrieved when it is to be later displayed in the selected frame. The machine-readable script will later be used to reproduce the educational presentation within the multi-frame screen of FIG. 8 (as generally described in conjunction with the delivery system of FIG. 7).

FIG. 10 shows an initial portion of a machine-readable script produced by the method; in particular it shows the digital content added to the title, presentation and concepts frames during the first six minutes of Lecture 23 in the prototype course produced and tested with the claimed invention. In the example of FIG. 10, entries were made in both the Presentation and Title frames at 10.5 seconds; followed by a series of entries in the Concepts frame at 30.3 seconds, 1 minute (1:00.0), 1:19.8 and 1:46.1; followed b a new entry in the Presentation frame at 2:26.8, etc.

Should the operator insert digital content (DC) file in the presentation frame 38 and then decide not to permanently incorporate it into the educational program, the contents of frame 38 may be removed by clicking the delete icon in the Presentation group of controls 95. This will remove any DC visible in frame 38. Similarly, if the operator notes a mistake or omission in the DC displayed in frame 38 after it has been added to the script and made part of the educational program, correction or deletion may be achieved at any time the incorrect DC is displayed in frame 38. For example, to enter a correction, the operator first advances the video to the time when the error appears and then clicks on the frame to be corrected (in frame 38 in this ongoing example) in a manner identical to that described in conjunction with step 45 (FIG. 6). The operator then enters the correction using the same means used to enter DC originally. Any corrections, modifications or substitutions will be visible to the operator but will not become a fixed part of the educational program. To save the corrected DC in frame 38 as part of the educational program (in place of the incorrect DC), the operator clicks on the "Change" button in the Presentation group of controls 93 (FIG. 5C). The production program 114 (FIG. 9) responds by replacing the previously affixed file or database entry containing the incorrect DC for frame 38 with a new file or entry containing the corrected DC. The corrected DC becomes a fixed part of the educational program and will appear in frame 38 each time the video (TBDM) advances to the DST at which the corrected entry was made.

Use of the Clear button in the Presentation group of controls 93 (FIG. 5C) causes the operator's view of the DC in frame 38 to revert to a blank frame 38 as shown in FIG. 5B. It is important to note that this Clear button is simply a convenience allowing the operator to quickly clear all DC from within presentation frame 38. It has no effect on DC already saved as files or database entries as part of the educational program; nor, does the Clear function have any impact on the script (e.g. FIG. 10) describing the DST for each file or database entry. Use of the "Hide" in the Presentation group of controls 93 (FIG. 5C) has the same effect as clicking the Clear button 92 then immediately clicking the Save button. The Clear button removes all visible contents from frame 38 and this blank frame is Saved as a new file or database entry. The corresponding script entry will cause frame 38 to blank (show no DC) when this point DST in the educational program is reached during playback. The behavior of the corresponding icons and buttons in the Title group 96 and Concepts group 95 produce correspondingly educational functions in relation to DC added, deleted or modified in Title frame 35 and concepts frame 36, respectively. As content is inserted and saved in any one frame, the added content is stored on computer 29 (or server 32) and a corresponding entry is made in the machine-readable script (FIG. 10).

Occasionally, the operator may wish to delete portions of the digital content in the TBDM displayed in the video frame. This production function is accomplished by first clicking the Video Cut Start icon 96 at the desired DST (the point in the TBDM when the removal of video is to begin). Next, the operator proceeds to step 48 (FIG. 6), and selects another DST. At this later DST the operator clicks on the Video Cut Stop icon 97 (the point in the TBDM at which deletion of video is to cease). Selecting this pair of Start and Stop times has no impact on the TBDM or the educational program.

For the video cut to become a part of the educational program the producer must click the Save icon 104 (FIG. 5D) associated with video frame 36. A mistakenly entered video cut may be removed by clicking delete button 105 at any time when the currently selected DST falls between the Video Cut Start time and the Video Cut Stop time.

The Video Cut increment (+) and decrement (−) buttons 98 provide the operator with fine control over the start and end times of video cuts. The Start and Stop times selected using buttons 96 and 97 can be advanced or retarded in very small time increments. In the fully functioning system, the increment and decrement buttons move the Video Cut Start or Video Cut Stop times forward or back by $\frac{1}{10}$ second per click When a set of video cut commands have been entered into the script for an educational program, the selected DC does not appear or play back. The program advances immediately from the Start time to the Stop time.

At any time during the execution of step 46 (FIG. 6) the operator may choose to employ the Text Formatting controls 99 to modify the size or appearance of any DC that is displayed in any of the frames as font characters. These formatting controls allow, for example, such characters to appear in different fonts, be made larger or smaller, be shown as bold, italic or underlined or be displayed in different colors.

During the production process, if additional DC is to be entered in a currently selected frame or in another frame at the current DST, step 48 (FIG. 6) is followed by a repetition of steps 44 through 47. This series of intermediate steps may be repeated as many times as necessary to enter desired DC in selected (or all) frames before advancing to a later DST. This repetition of steps may also be followed to correct DC incorrectly entered in any of the frames of the current DST. After all desired modifications to the DC displayed in each frame have been made the operator proceeds to step 49, and the selection of another DST.

To insert additional DC at another DST, the operator proceeds from step 49 to step 44, and the selection of a new DST. A new DST may be selected by several means, some of which involve use of the controls on panel 40 shown in FIG. 5C. These controls are visually identical to those of the playback control panel shown enlarged in FIG. 8C. For clarity, the individual controls of the playback control panel (FIG. 8C) will be referred to in discussing the operation of the control panel 40. Typically, a new DST will be selected by clicking on the Play button (the leftmost button of the playback control panel 40 shown in FIG. 5C and item 70 in FIG. 8C). This advances the TBDM in real time and allows the operator to watch the digital video content until an appropriate point is reached for insertion of supplemental DC into one of the other frames. The new DST is then selected by clicking on the Stop button, which is the second button from the left on the playback control panel 40 shown in FIG. 5C and item 70 in FIG. 8C.

Alternatively, the operator may select a new DST from the production control panel 39 (FIG. 5C). Specifically, a new DST may be selected through use of either the fast forward or the reverse buttons included at the upper right and left of the navigation control set 91. The prototype system was programmed to move the TBDM forward or back in ½ second increments to allow more precise selection of the DST. These incremental shifts in the TBDM were implemented by clicking on either the "+" or "−" buttons in the navigation control set 91 (FIG. 5C). After a new DST has been selected, the operator repeats steps 44 through 48 (FIG. 6) as required to select and enter the DC to be associated with the new DST. When all of the DC has been saved as part of the script (step 47) at the new DST, the operator will repeat steps 44 through 48 until all selected DC has been entered in each frame and in association with each selected DST. Each time DC is entered, a corresponding line is generated in the script file (FIG. 10) indicating the relative time, the frame involved and the location for the file to be entered in the designated frame on playback.

When each selected DST and the associated DC have been entered and saved for the current TBDM, the operator may proceed to step 50 and select another TBDM in the same manner previously described in conjunction with step 43. Steps 43 through 50 are then repeated for the newly selected TBDM and each additional TBDM incorporated into the educational program. In the prototype educational program, there were a total of 27 digitized lectures, each having approximately 83–87 minutes of audio-video content (forming a corresponding number 27 TBDM's) and approximately 4700 digital content files for entry in the three independent frames 35, 37 and 38. During production, machine readable scripts were generated for each of the 27 lectures. An excerpt from the beginning of one such script is shown in FIG. 10.

When all desired TBDM have been included and supplemented with DC, production of the educational program is complete and operator will proceed to step 51. Step 51 may include the transfer of the completed presentation from production server 32 (FIG. 4) to the delivery server 54 of FIG. 7. Alternatively, the production server 32 of FIG. 4 and delivery server 54 shown in FIG. 7 may be the same machine. Alternatively, the finished educational program with supporting DC and script files (or portions thereof) may be transferred to a CD or other portable media 31 (FIG. 4) or 53 (FIG. 7) for later physical delivery to the user's computer.

Delivery Overview

Following the transfer of the finished educational program and any supporting files to a delivery device such as the portable media 31 (FIG. 4) or delivery server 54 (FIG. 7) the educational program can be asynchronously accessed and viewed by one or more end users.

A user may access the educational program through a general purpose computer or other computing device 57 (FIG. 7) capable of displaying the multimedia files that make up the presentation. Where computer 57 is connected through network 55 (e.g., the internet, an intranet or a combination thereof) to delivery server 54, all or selected portions of the educational program and supporting materials may be delivered to the end user utilizing this network connection. Optionally, all or selected portions of the educational program may be stored on removable media 53. In this case the portions of the educational program stored on removable media 53 are played back directly from the removable media and may be supplemented, updated or enabled by other data transmitted over the network to the end user's computing device.

A typical delivery session begins with the user starting a standard or purpose-built software application that facilitates viewing the educational presentation. Where viewing the presentation involves the use of removable media 53, a typical session might include the user providing an identification number, a serial number or other form of decryption key to gain access to the content of the removable media. Where viewing the educational presentation involves transfer of at least some of the educational presentation over network 55 a typical session may additionally include the user logging into the delivery server 54 by entering information that allows the server to identify the user and verify the user's right to view the educational presentation. After successfully completing these initiation steps, the viewing software application will display on the user's monitor an ornamental screen such as the one shown in FIG. 8A. The number of frames and their configurations is a matter of the producer's ornamental design choice.

Figure 8A:
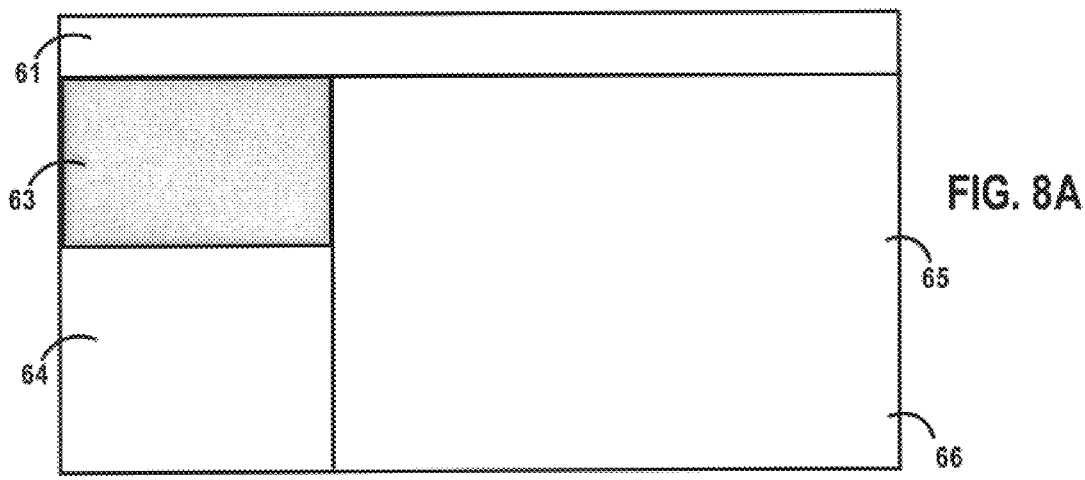
FIG. 8A shows an ornamental screen design displayed to the user upon opening an educational program delivered in accord with the prototype embodiment of the invention described. This screen has the same configuration as the screen shown in FIG. 5A without the control panel.

The frames 61, 63, 64 and 65 of the blank screen shown in FIG. 8A spatially correspond to frames 35, 36, 37 and 38 of the production screen of FIG. 5. That is, information entered during the production process into the title frame 35 will be displayed to the end user in the title frame 61 of the playback system (FIG. 8A). The same is true with respect to the corresponding video frames 36 & 63, concept frames 37 & 64 and presentation frames 38 & 65. The optional notes frame 66 suggested by the broken line in (FIG. 8A) may be used to display notes entered by the user while viewing an educational presentation. Notes taken frame 66 may be stored either on the delivery server 54 or the user's computer 57 or these notes may be written to a temporary file which can be e-mailed to the user at the close of the session. Preferably, the vertical dimension of the frame 66 will correspond to the verticle dimension of the control bar 39 (FIG. 5A).

Figure 8B:
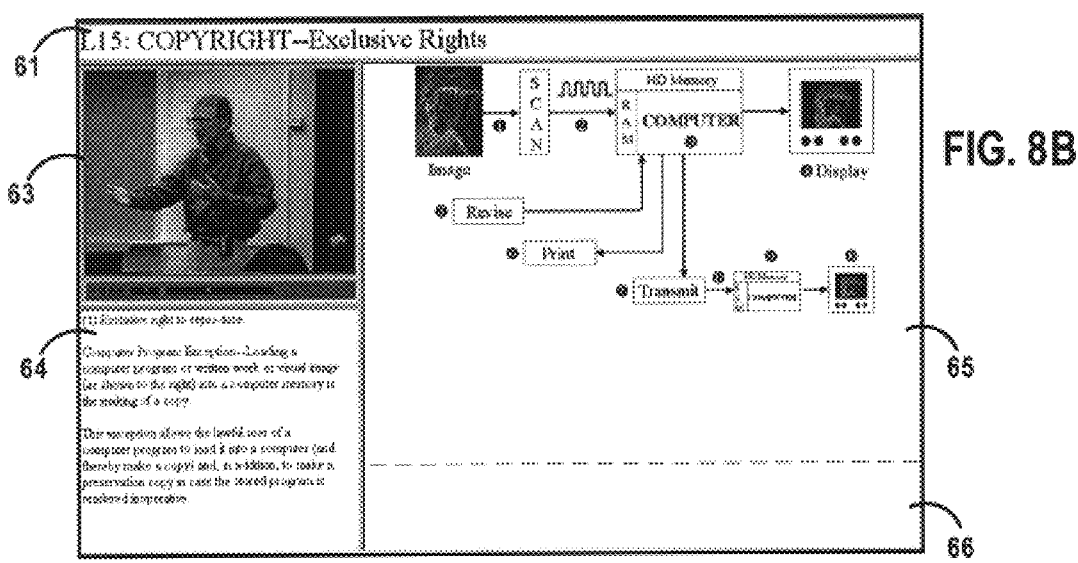
FIG. 8B shows the screen of FIG. 5C as seen by the user during delivery of an educational program, produced in accord with the description of FIGS. 5A through 5E.
Figure 8C:
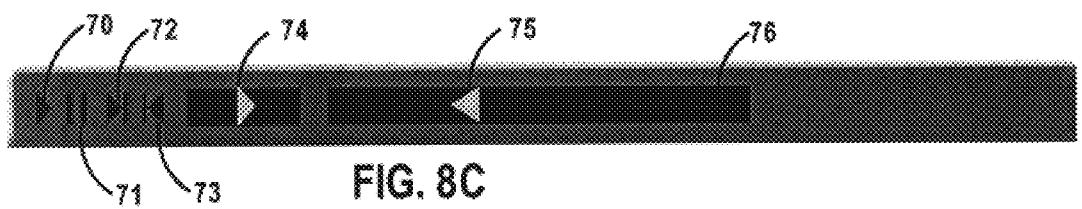
FIG. 8C shows a detailed view of the video control bar that appears below the video frame of FIGS. 5 and 8 as seen by the user of an educational program.

After the blank screen of FIG. 8A is displayed, the video frame 63 will proceed to display the initial portion of the selected educational presentation (TBDM). The video frame 63 will then appear as shown in the example of FIG. 8B and will include a normal array of video controls as shown in detail in FIG. 8C. At this point, a user will normally begin viewing the educational presentation by clicking the play button 70 of the playback control panel (FIG. 8C). The TBDM then begins a presentation of its continuous stream of synchronous digital audio and/or video within the video frame 63 (FIG. 8B). Simultaneously, the playback system begins monitoring the machine-readable script files as generally shown in the excerpt of FIG. 10.

When the TBDM's internal time index reaches or exceeds a time value present in the script (e.g., FIG. 10) the script executes the particular line associated with that time. Execution of a line of the script causes the title frame 61, presentation frame 65 or concepts frame 64 to display new or additional content files. Referring to the script shown in FIG. 10, when the user initially presses the play button 70 (FIG. 8C), the title, presentation and concept frames are empty as shown in FIG. 8A. When the playback system recognizes that the TBDM's internal time index has reached or exceeded 10.5 seconds the first two lines of the script (FIG. 10) are executed. Execution of the script's first line causes the picture shown in the presentation frame 65 (FIG. 8B) to be located and loaded into the presentation frame 65. Execution of the second line of the script (about 10.5 seconds) causes the HTML text, "L15: COPYRIGHT—Exclusive Rights" to appear as shown in the title frame 61 (FIG. 8B). The playback system continues monitoring the TBDM's internal time index and the script entries and updates the contents of each frame as dictated by the machine-readable script files which were generated during production of the educational program (step 47, FIG. 6).

With the controls of the panel shown in FIG. 8C, the user can navigate or track progress through the presentation. The play button 70 causes the TBDM to begin or resume displaying its internal stream of digital audio and/or video at any time when the stream is not already being displayed. The pause button 71 causes display of the TBDM's stream to pause until the play button 70 is clicked to restart the display. In one embodiment of the playback system the fast forward 72 and rewind 73 controls cause the current time index of the TBDM's stream to skip a predetermined span of time (e.g. 5–10 seconds) either forward or backward. In another embodiment of the playback system, clicking the fast forward 72 or rewind 73 buttons causes the TBDM's current time index to be set to either the next or previous script entry (FIG. 10). This allows the user to topically tack portions of the presentation in terms of the corresponding title, concept or other supplemental content associated with various segments of the TBDM.

The playback control panel of FIG. 8C also contains an audio slider 74 that allows the user to adjust the volume of any audio portion of the TBDM during playback. Utilizing a mouse or other pointing device attached to the playback device 57 (FIG. 7), the user adjusts the volume by clicking anywhere on the slider and/or dragging the slider to the desired position within a predetermined range. Audio volume is lower when the slider is near the leftmost portion of its range and higher when it is near the rightmost portion of its range.

A final component of the control panel of FIG. 8C is a playback slider 75. The playback slider 75 is utilized in the same manner as the audio slider 74 but it controls the current playback time within the TBDM. That is, selecting a new location via the playback slider 75 has the effect of selecting a new time index within the current TBDM, resulting in the display of a different portion of the educational presentation.

In the prototype embodiment of the present invention, the delivery server 54 shown in FIG. 7 was a Silicon Graphics (SGI) Origin 200 server running SGI's IRIX operating system. This server 54 delivered the educational presentation asynchronously through the university intranet ($^{10}/_{100}$ Mb bandwidth) to 57 students enrolled in the Commercial Torts course previously described. Students received the 40 hours of multimedia-lectures on general purpose computers located in the law library at Arizona State University. These computers were running Microsoft's Windows NT operating system. The computers used by the students were provided with the delivery software described in the correspondingly named section below.

The delivery server 54 communicated with the playback devices 57 (FIG. 7) over the university intranet using Samba, a well-known means for enabling connectivity between UNIX and Windows computers on a network.

Production Software

This section will describe the architecture and functionality of the software used to implement the production system previously described in conjunction with FIGS. 4–6, 9 and 10. The software used to implement the prototype system, was written entirely in the Java programming language and is based on the Java2 Standard Edition (version 1.3) Software Development Kit ("SDK") and the Java Media Frameworks (version 2.1) SDK. Both of these software packages are available from the Sun Microsystems Java web site (http://java.sun.com). Portions of the related code are reproduced in the accompanying Appendix A and will be selectively referred to using the citation form "A:1X", where "A" refers to the Appendix and "1X" refers to Section 1, Part X. Class member methods, member data, class definitions and other source code that is referenced in the following description will appear in italic text (e.g., main(string Args[ ]). Appendix A is incorporated herein by reference. The development environment used in the production of the software used to implement the prototype system was the application known as "Forte for Java Community Edition (version 1.1)". This software package is also available from Sun Microsystems (http://java.sun.com). Appendix B filed herewith comprises a standard compact disc (CD) that includes the executable code used to produce and deliver the prototype course described. Appendix B includes six folders: (1) A folder entitled "Lecture Maker" (including two subfolders "bin" and "src") that contains the code which cooperates with the Java Media Foundation (JMF) in the production of multi-media educational presentations in accord with the present invention. (2) A folder entitled "jmf-2_1_1-win.exe (including multiple subfolders) that contain the Java Media Foundation. (3) A folder entitled "j2sdk-1_3_1-win.exe" (including multiple sub-folders) that contains the Java Development Kit (JDK). (4) A folder entitled "Client" (including sub-folders "bin" and "src") that contains the code for displaying a completed educational program on an end user on a client computer. (5) A folder entitled "Sample Presentation" (including content, html, TBDM and script files) that provides a very short (15 seconds) demonstration of a simple multi-media presentation created and structured for delivery in accord with the present invention. (6) A folder entitled "Instructions" that explains how to install and run the production ("Lecture Maker") and delivery ("Client") applications. Appendix B, comprising approximately 38 MB, is incorporated herein by reference.

The process steps described in conjunction with the flowchart of FIG. 6 are carried out by the classes described and defined in FIGS. 11–17. This set of diagrams serves to describe: (a) the purpose-built classes included within the production software; (b) the standard Java classes upon which the production software depends; (c) the interrelationships among the classes within the production software; and (d) the inheritance relationships among the classes upon which the production software depends. FIGS. 11–17 taken together with the source code examples in Appendix A define the production software used in conjunction with the prototype production system.

The TortsApp class is the core of several classes that combine to make up the production software. As such, the TortsApp class contains the main( ) method and will be the first class instantiated when program execution begins.

The production software begins operation at the initiation of the step identified as box 42 in the flowchart of FIG. 6. The software initially calls the program method identified as main(stringArgs[ ]) (see A:1A). Execution of this program method begins with the creation of an instance of the class TortsApp shown in detail in FIGS. 12B & 12C. This is accomplished by means of a call to the corresponding constructor method, TortsApp( ) (see A:1B).

The contructor method TortsApp( ) sequentially performs four steps: (1) initializing the components of the Graphical User Interface (GUI) (other than the instances of the JeditorPane class shown as 35, 37 and 38 of FIG. 5A) by means of a call to the program method initVomponents( ) (see A:1C); (2) calling the native Java pack( ) program method; (3) initializing each instance of JEditorPane and defining the behavior of the subset of controls shown on the control panel 39 in FIG. 5A under the title "Editing" by means of a call to the initEditorPanels( ) program method (see A:1D); and (4) creating an instance of the native Java class Vector named eventList.

The code included in A:1C is an example of a well-known methodology for creating and attaching components of a user interface to a visible window in Java. The code included subject creates an instance of the Java JEditorPane class and attaches it to the visible window depicted in FIG. 5A as the presentation pane 38. All other components of the production GUI shown in FIG. 5A are created and attached to the visible window that the same basic manner disclosed in B:1C. Near the end of this code sample, the class AbsoluteConstraints (a part of the org.netbeans.lib.awtextra package) is referenced. This class and its companion class AbsoluteLayout are not part of the standard Java language but are made available by the installation of the "Forte for Java Community Edition" software. Together they allow visible components to be placed at absolute positions within the visible area of a window. The purpose-built classes used to create all of the components that are part of the user interface illustrated in FIG. 5 are described in FIGS. 11–17, which collectively constitute the class diagram for the prototype production application.

The initEditorPanels( ) source code (B:1D) initializes each instance of the class JEditorPane (35, 37 and 38 in FIG. 5A) in HyperText Markup Language (HTML) mode, thus allowing each of these JeditorPane instances to load, display, interactively edit and store documents internally represented in HTML. This code also defines the actions to be taken by and registers listeners for each of the set of 10 "Editing controls" shown on the control panel 92 of FIG. 5C. Complete documentation of the editing functionality available via an instance of the JEditorPane class may be found in the Java2 Application Programming Interface (API) documentation available on the Sun Microsystems Java web site (http://java.sun.com).

Immediately following the creation of the instance of the Vector class instantiated in the last line of the TortsApp( ) constructor method, the production software has completely created its GUI which shortly thereafter displayed on the monitor in the form shown in FIG. 5A. The execution of the program now enters an internal Java event loop and awaits input from the keyboard, a pointing device such as a mouse or other source of input that will trigger the further execution of sections of the production software and/or native Java executable code.

At this point an operator will normally initiate step 43 shown on the flowchart of FIG. 6 by utilizing a mouse or other pointing device attached to the production computer 29 of FIG. 4 to activate the video selection button ("V") best shown on the control panel 39 of FIG. 5C to the far left of the set of Video controls 94. This triggers the execution of the code sample shown in A:1E which displays the dialog shown in FIG. 5D. This dialog allows the operator to select a digital video file to be used as the Time-Based Driving Media (TBDM) referred to in step 42 of the flowchart shown in FIG. 6. Selection of a TBDM is accomplished by utilizing the mouse to select from a list of digital video files similar to that illustrated in FIG. 6. Upon selection of a digital video file (TBDM), the selected file's name will appear in the space to the right of the label "File Name" as shown in the dialog of FIG. 5D. The operator may then choose this file as the TBDM to be run in the Video frame 36 (FIGS. 5A–C) by utilizing the mouse to click the "Open" button shown in the lower right corner of the dialog (FIG. 5D). The production software will then open the selected TBDM file from the production computer 29 or from the production server 32 of FIG. 4, depending on where the TBDM content is stored.

Selection of a TBDM initiates execution of the video player initialization source code shown at A:1F. This code section creates the video player necessary to display the TBDM within the video frame 36 as shown in FIG. 5B. This code section also registers a listener that will detect any events (mouse clicks, etc.) associated with the representation of the video player within the user interface.

The code of the controllerUpdate( ) method reproduced at A:1G is executed whenever the local Java Virtual Machine detects an event within the video frame (video player) 36 (FIG. 5C). Events that will trigger the execution of this code include all actions the user initiates via manipulation of the video control panel 40, initial opening of a new TBDM, or any mouse clicks within the video frame 36 or video control panel 40. If a new TBDM has been opened, the code will initialize the scripting for the presentation to be associated with the new TBDM by calling the initializeScripting( ) method. If a new time index within the TBDM is selected, the code updates each frame of the user's display by calling the flipFrames( ) method.

Once the TBDM has been selected, the program enters the run( ) method reproduced at A:1H. The run( ) method acts as a sequencer for scripted events by putting the thread responsible for changing the content of individual frames to sleep for an amount of time equal to that between the TBDM's current index and the next time indicated in the script for the current educational presentation.

Whenever a user inserts digital content into an educational presentation by clicking any of the "Add Content" buttons (discussed in conjunction with FIG. 5C), the addEvent( ) code of A:1I is executed. The purpose of this code section is to add a new event to the internal script maintained by the software during production of the educational presenation. The addEvent( ) method adds the new event to both the internally-maintained script and a script stored on a permanent storage medium on the production computer 29.

The rapid production of an educational presentation can be an intense undertaking that requires continuous integration of sequenced content for properly timed display in association with the TBDM content. Despite the operator's best efforts mistakes may occur: digital content files may be entered into the wrong frame or at the wrong time relative to the TBDM or stored incorrectly or for display during an incorrect duration. The code represented in A:1J functions to remove such erroneous events from the internally generated and stored scripts. This action is triggered by the user clicking one of the "Delete" buttons (discussed in conjunction with FIG. 5C) to delete the prior event in the corresponding frame.

When correctible errors have been introduced into the content of a frame during the production of an educational presentation, correction may be achieved within the proper frame(s) and clicking a corresponding "Change" button (described in conjunction with FIG. 5C). When one of the "Change" buttons is clicked by the operator, the code found in A:1K is executed. This code modifies the files that are to be displayed as part of the educational presentation to reflect the operator's newly-entered additions, modifications or deletions.

During the production of an educational presentation, previously-entered content becomes visible within the frames just as it was entered. When the program detects a change (script entry) the updateFrame( ) method is called to change the content from whatever is currently displayed to the new content indicated by the script entry that caused the execution of the updateFrame( ) method.

Figure 11:
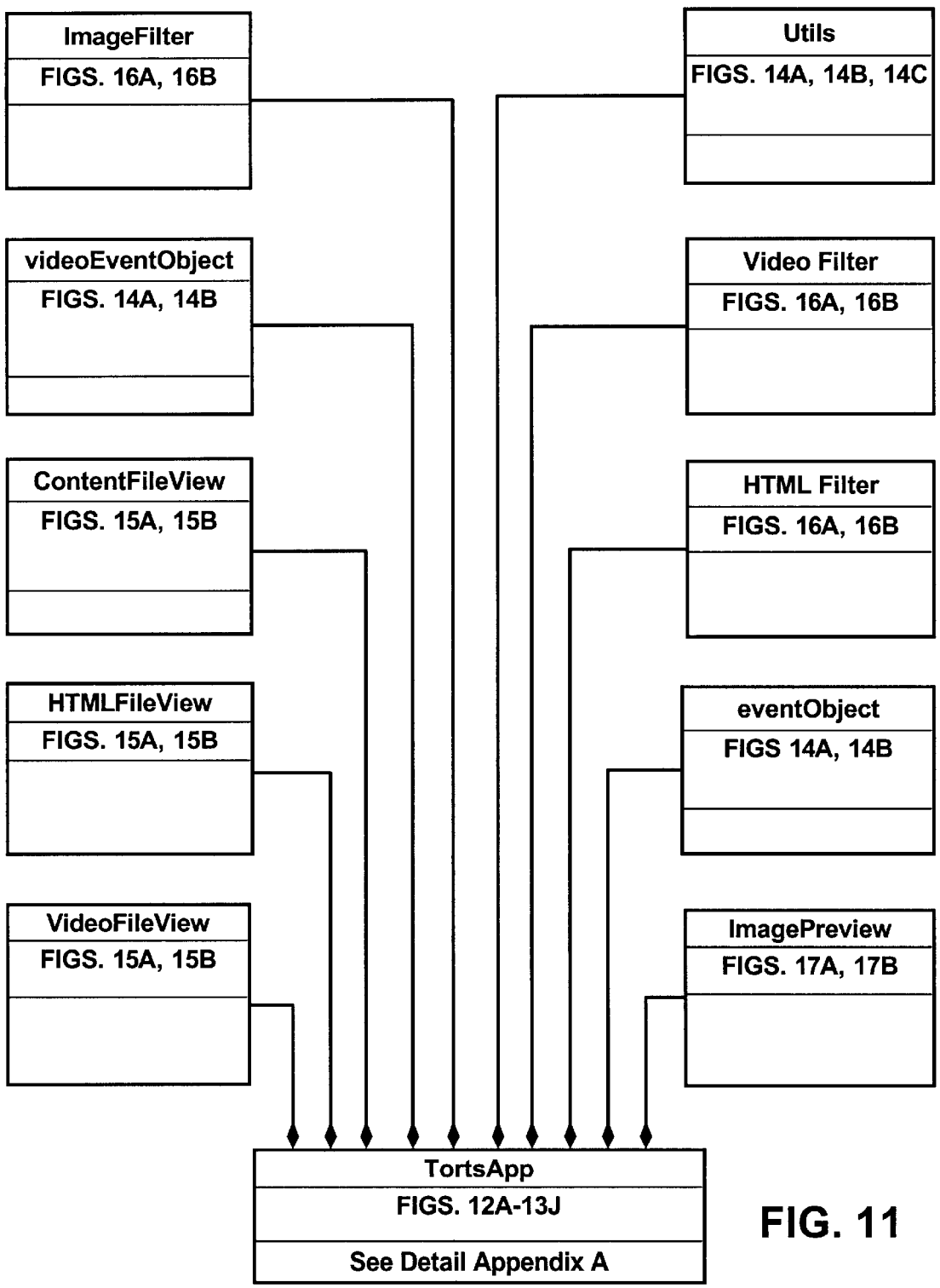
FIGS. 11–12 provide a written description in diagrammatic form of the inheritance relations among the indicated Java language classes used in implementation of the TortsApp class integral to implementation of the prototype embodiment of the invention.

FIGS. 11–13 collectively provide a written description in diagrammatic form of the specific dependency relationships involved within the TortsApp class. By contrast, FIG. 14A illustrates one of the numerous simple relationships that inherently exist between the standard Java classes and the classes identified as: eventObject, videoEventObject, Utils, ImageFilter, VideoFilter, HTMLFilter, ImagePreview, VideoFileView, ContentFileView and HTMLFileView. By way of example, source code for the eventObject class (FIGS. 14A & 14B) is disclosed in Appendix A Section 2. As will be apparent to Java programmers, the inheritance diagrams of FIGS. 14A & 14B and the source code contained in A:2 completely define the functionality within and the dependencies of the eventObject class. The other classes listed above are likewise disclosed by the inheritance diagrams of FIGS. 14–17 and the corresponding source code contained in A: 3–11

Figure 12A:
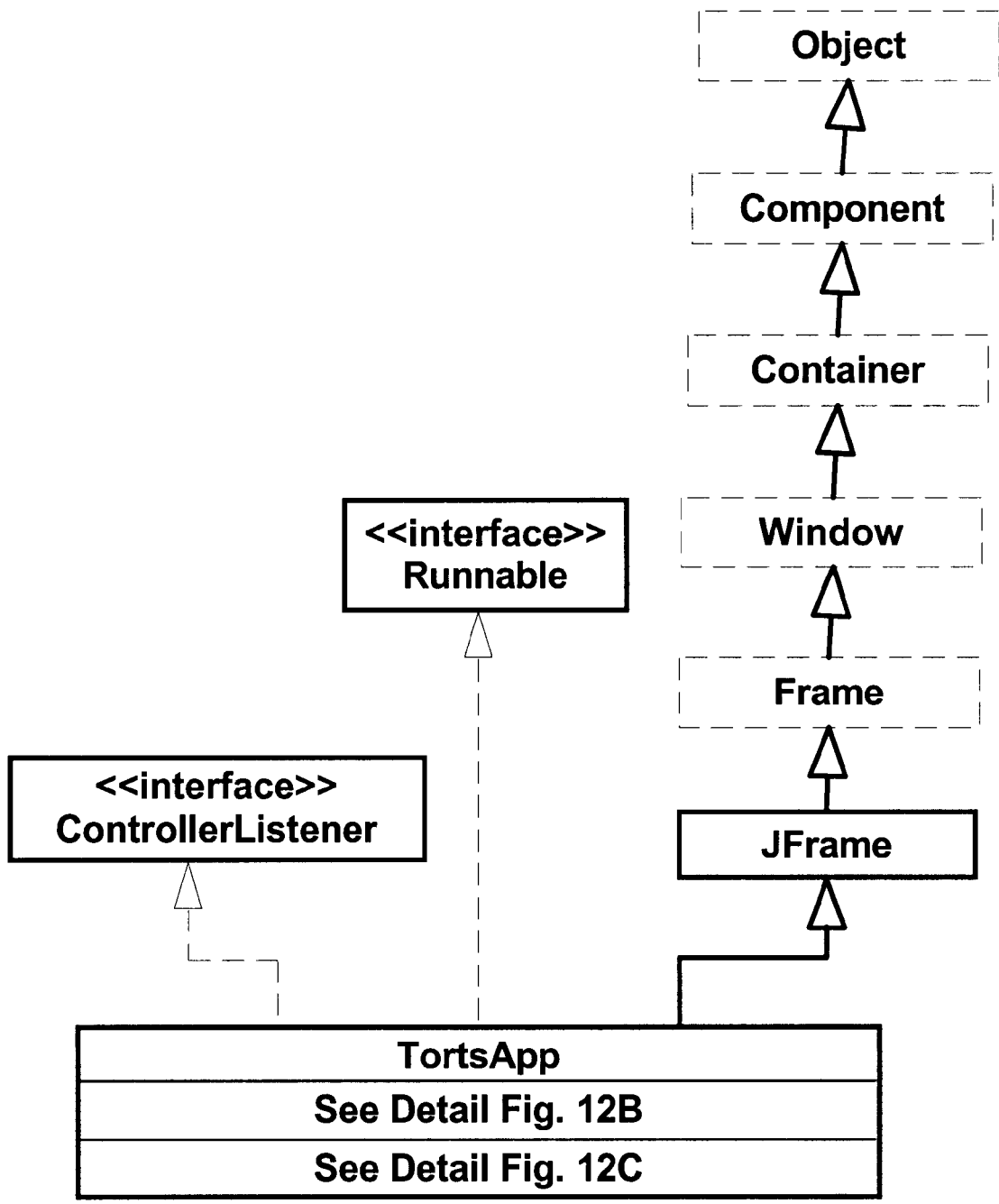

FIGS. 11 & 12 provide a written description in diagrammatic form of the inheritance relationships among the indicated Java language classes used in implementation of the TortsApp class. Specifically, FIG. 12A shows the inheritance by the TortsApp class of functionality from the Java JFrame class and the implementation of the Java ControllerListener and Runnable interfaces, while referencing the TortsApp class member data and methods as specifically disclosed in the tables of FIGS. 12B and 12C. FIG. 12B specifically enumerates the TortsApp class member data, while FIG. 12C enumerates the TortsApp Methods.

Figure 16A:
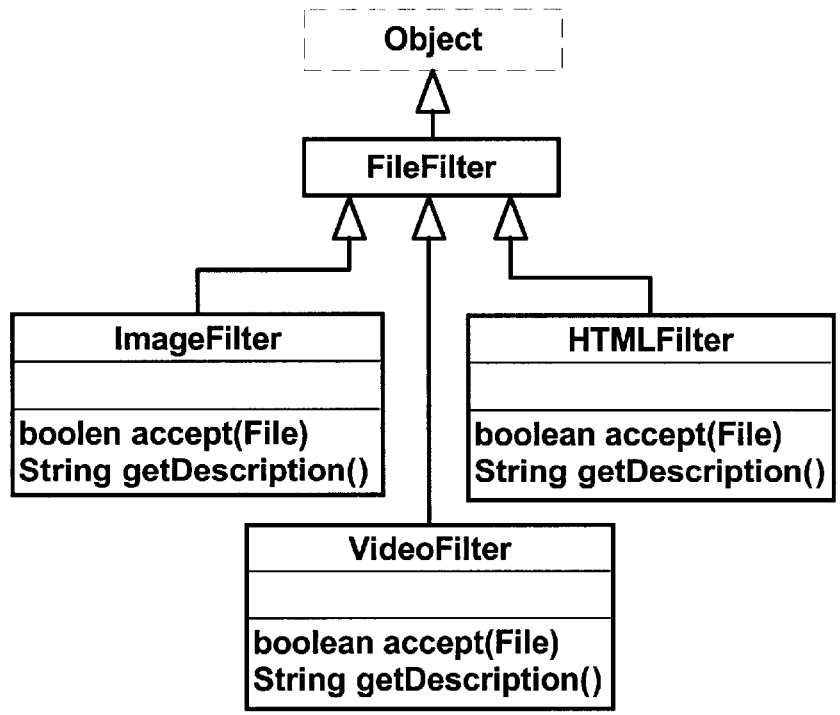
Figure 16B:
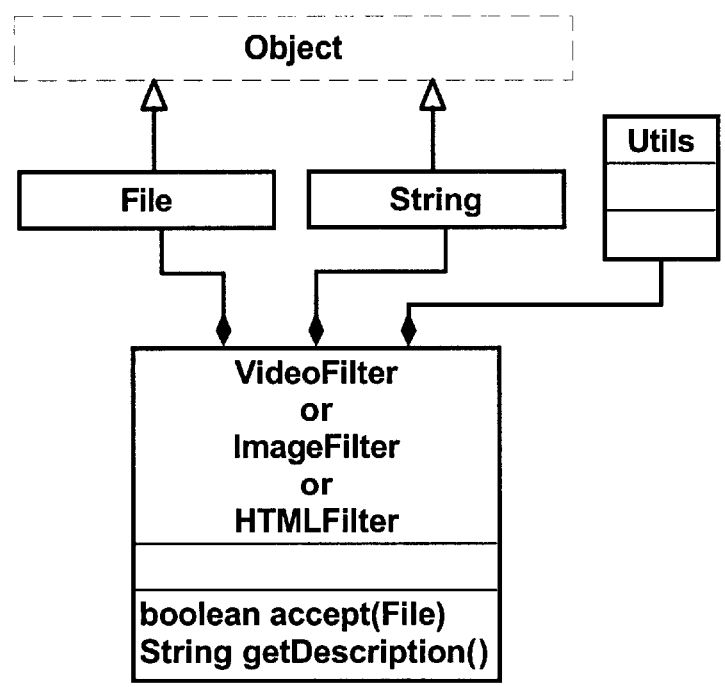

FIG. 16 provides a written description in diagrammatic form of the inheritance relationships among the indicated Java language classes used in implementation of the ImageFilter, VideoFilter and HTMLFilter classes. Specifically FIG. 16A shows the inheritance by the ImageFilter, VideoFilter and HTMLFilter classes of functionality from the Java FileFilter class.

Figure 15A:
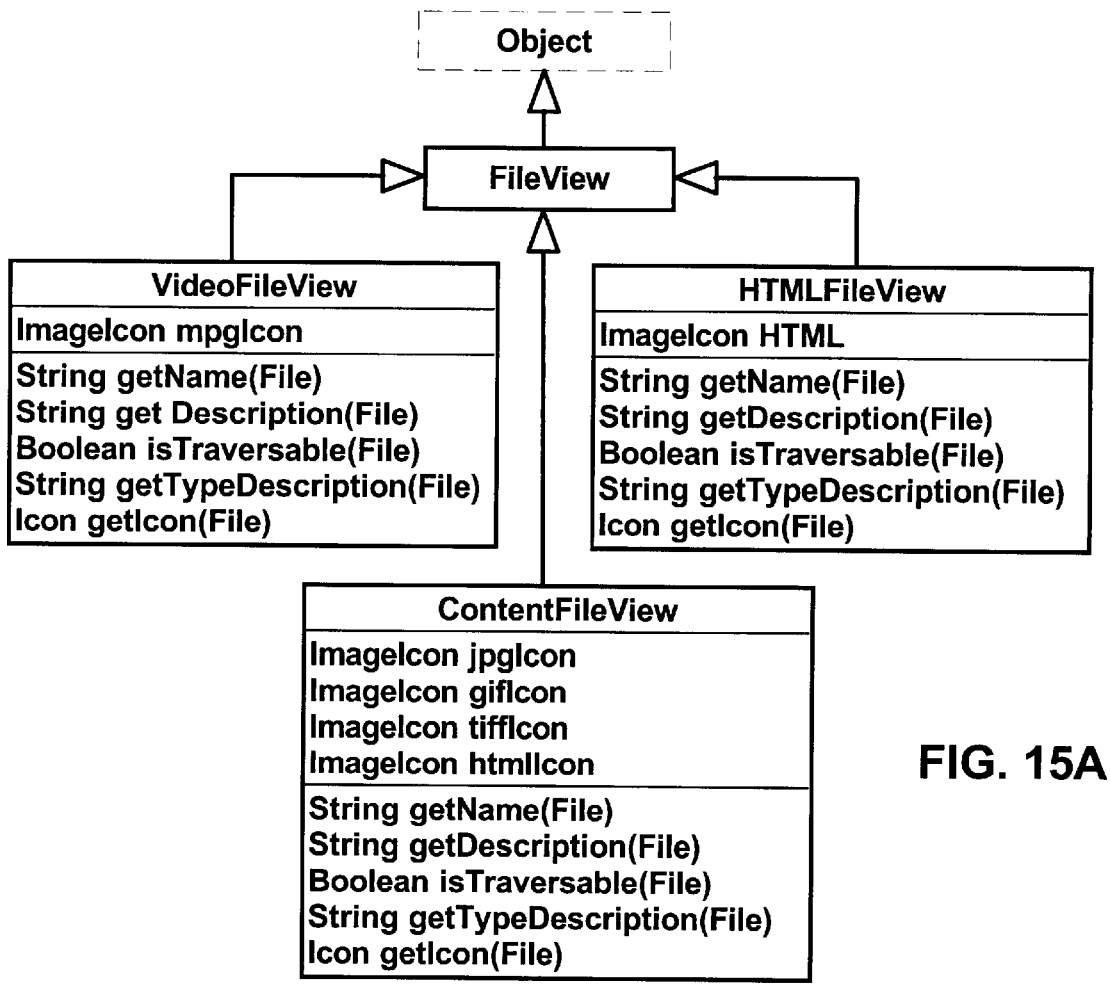
FIGS. 15–17 collectively provide a written description in diagrammatic form of the inheritance relationships among the indicated Java language classes used in the implementation of the specified classes of functionality or the specified interfaces.
Figure 15B:
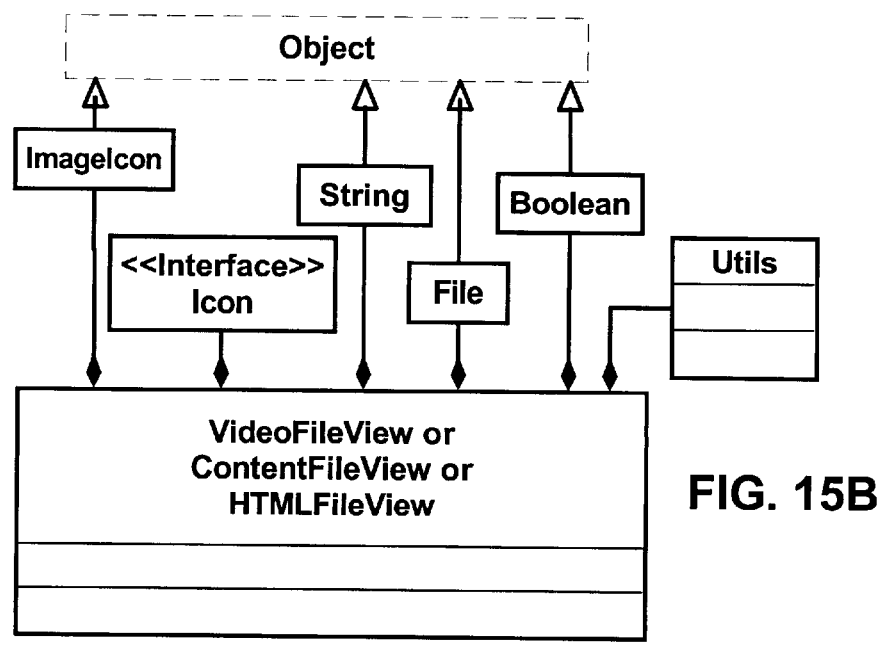

FIG. 15 provides a written description in diagrammatic form of the inheritance relationships among the indicated Java language classes used in implementation of the VideoFileView, ContentFileView and HTMLFileView classes. Specifically FIG. 15A shows the inheritance by the VideoFileView, ContentFileView and HTMLFileView classes of functionality from the Java FileView class.

FIG. 14 provides a written description in diagrammatic form of the inheritance relationships among the indicated Java language classes used in implementation of the eventObject, videoEventObject and Utils classes. Specifically FIG. 14A shows the inheritance by the eventObject, videoEventObject and Utils classes of functionality from the Java Object class.

Figure 17A:
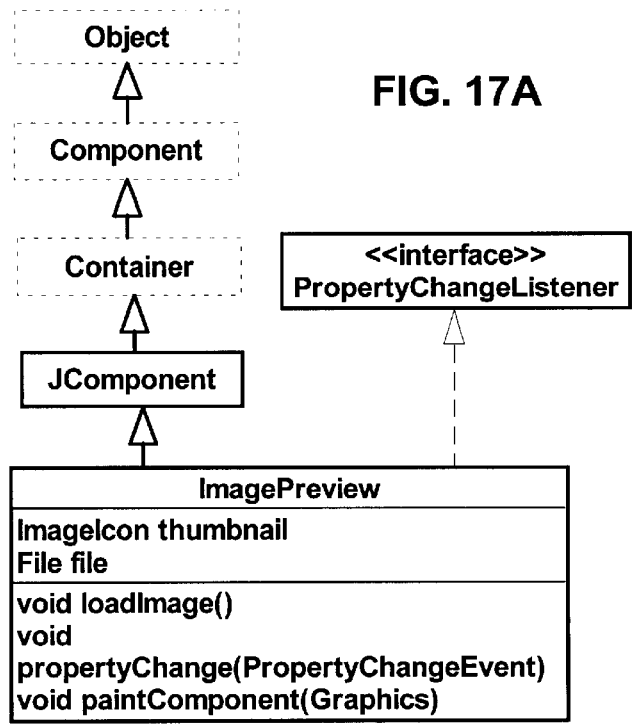
Figure 17B:
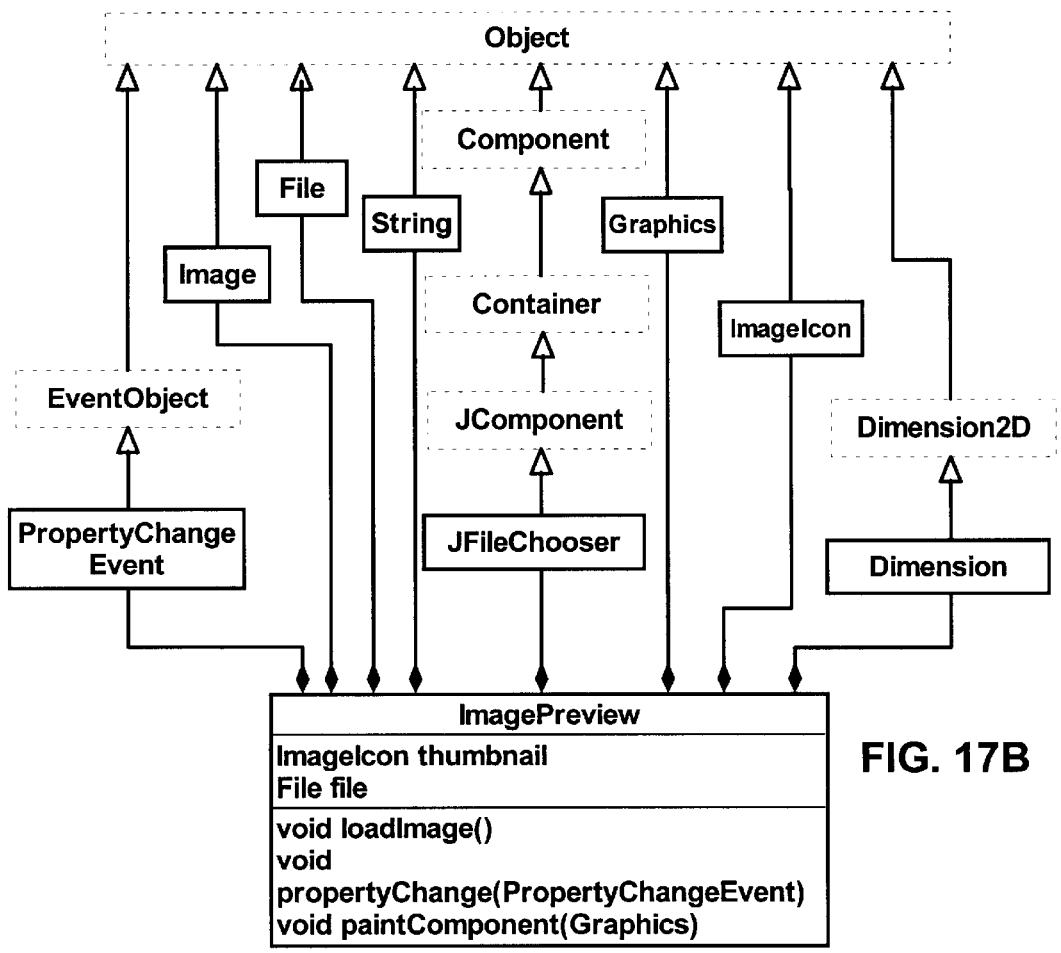

FIG. 17 provides a written description in diagrammatic form of the inheritance relationships among the indicated Java language classes used in implementation of the ImagePreview class. Specifically FIG. 17A shows the inheritance by the ImagePreview class of functionality from the Java JComponent class and the implementation of the Java PropertyChangeListener interface.

Figure 13A:
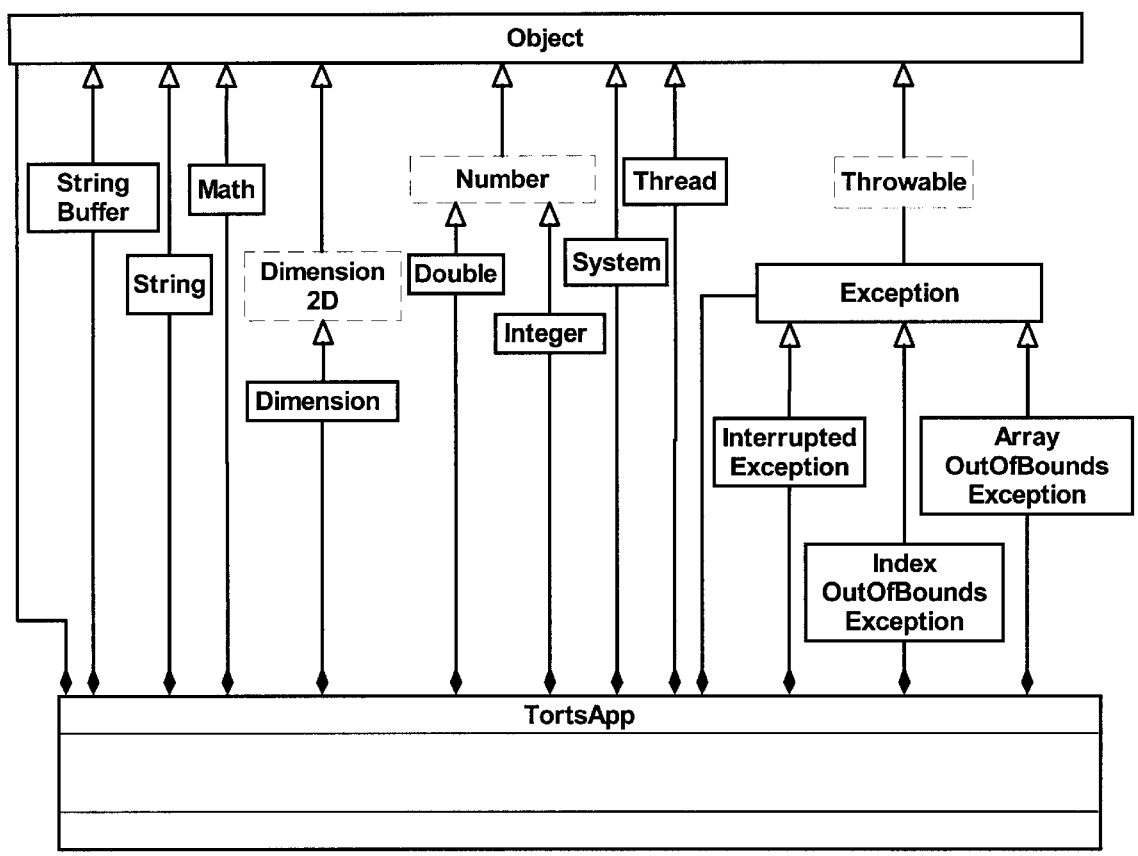
FIG. 13 collectively provide a written description in diagrammatic form of the dependencies and interrelationships among the indicated Java language classes that are functionally incorporated into the implementation of the TortsApp class integral to implementation of the prototype embodiment of the invention.

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13A:

Object
StringBuffer
String
Math
Dimension
Double
Integer
System
Thread
Exception
InterruptedException
IndexOutOfBoundsException
ArrayOutOfBoundsException Each of the classes listed above is part of the standard Java language and may be found within the java.lang package.

Figure 13B:
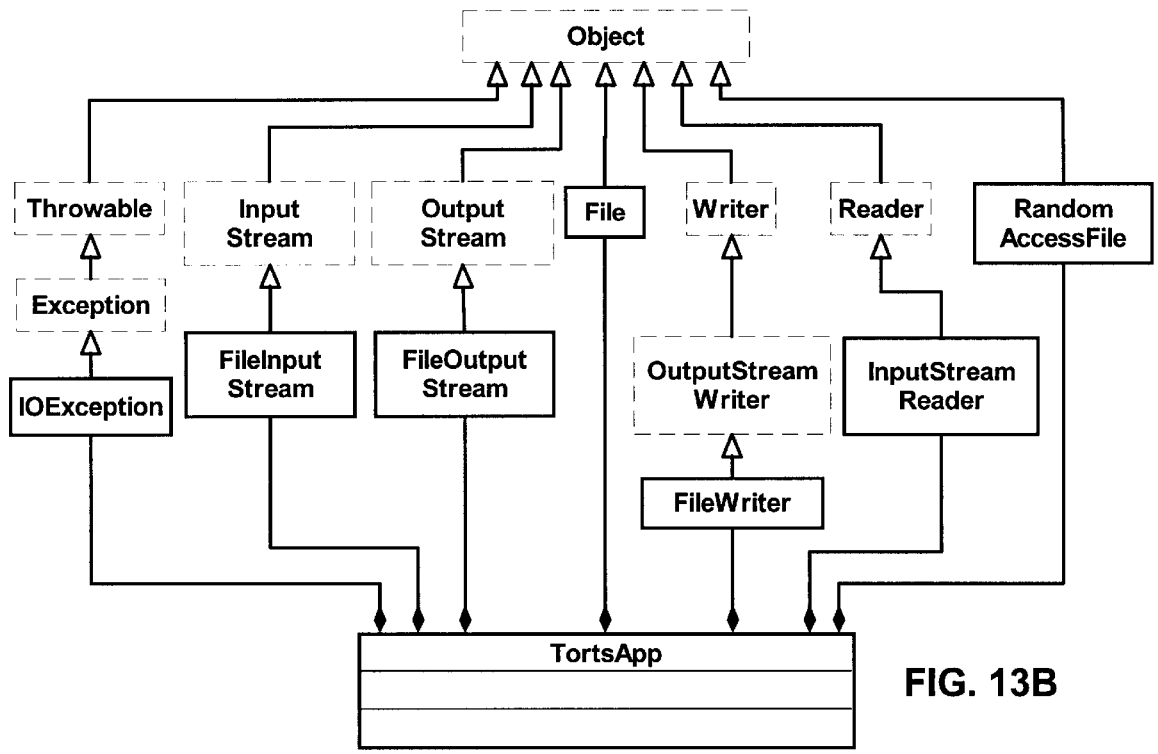
Figure 13C:
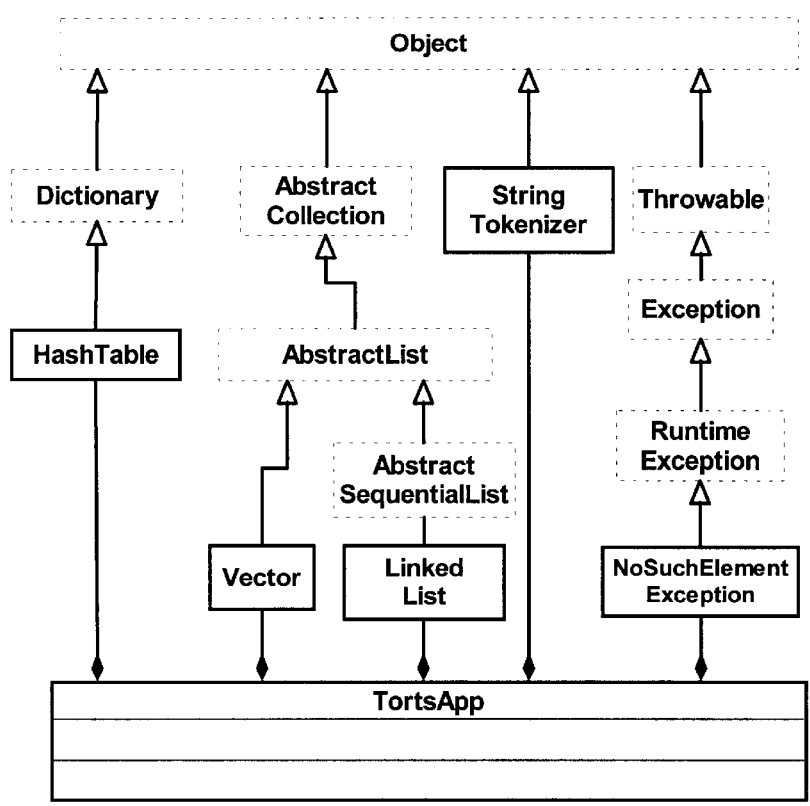
Figure 13D:
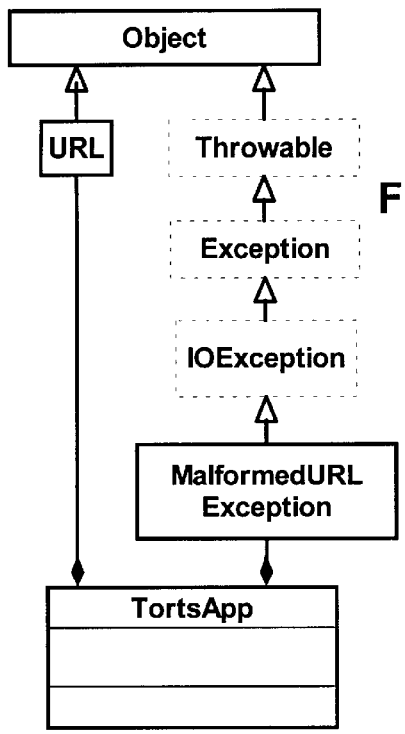
Figure 13E:
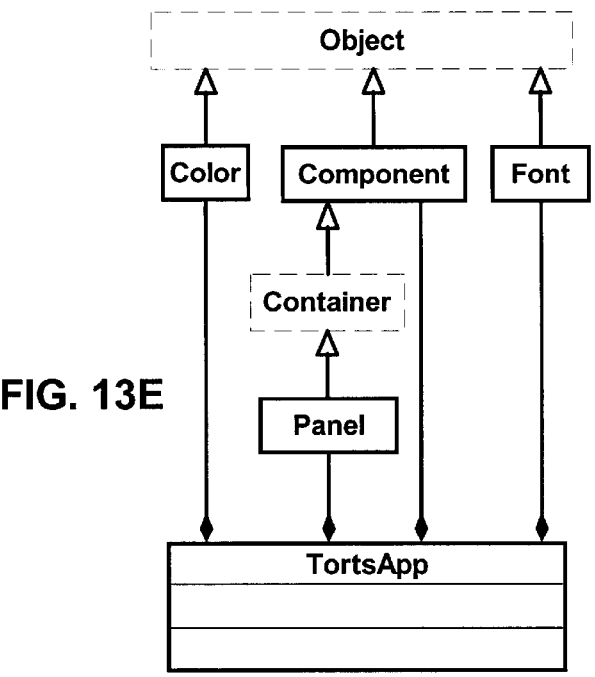

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13E:

Color
Font
Panel
Component

The above classes are a part of the standard Java language and may be found within the java.awt package.

Figure 13F:
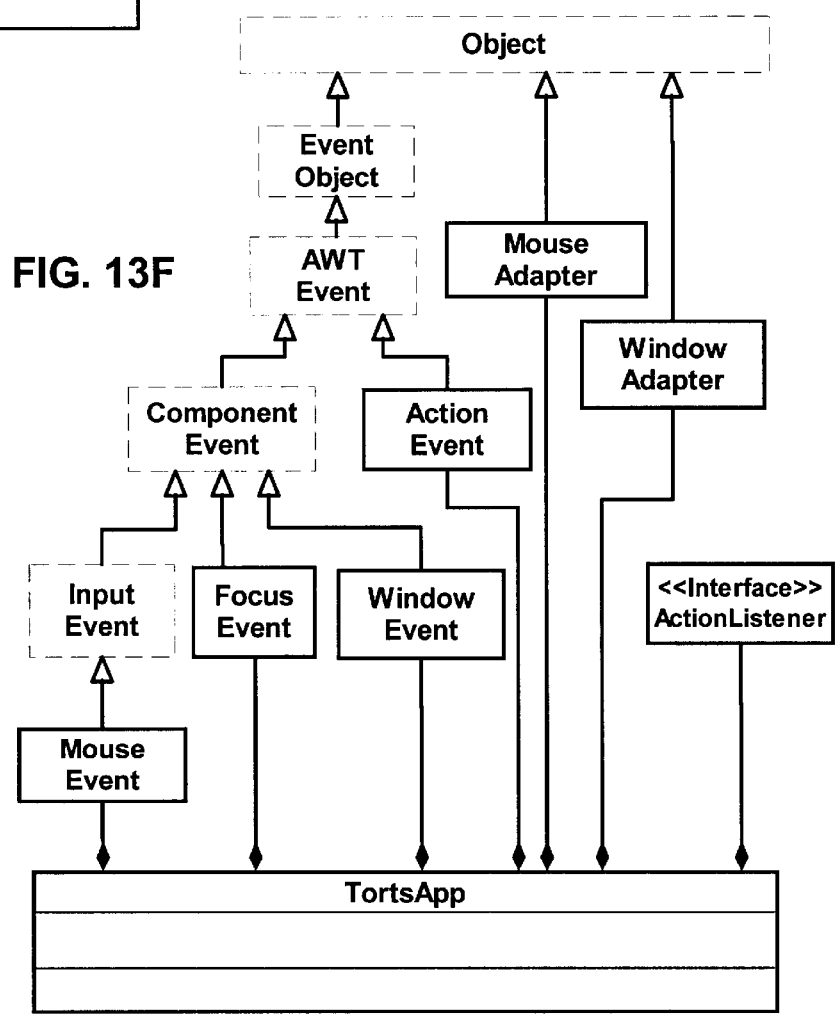

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13F:

MouseEvent
FocusEvent
WindowEvent
ActionEvent
MouseAdapter
WindowAdapter

And the following interface

ActionListener

The above classes and interface are a part of the standard Java language and may be found within the java.awt.event package.

Figure 13G:
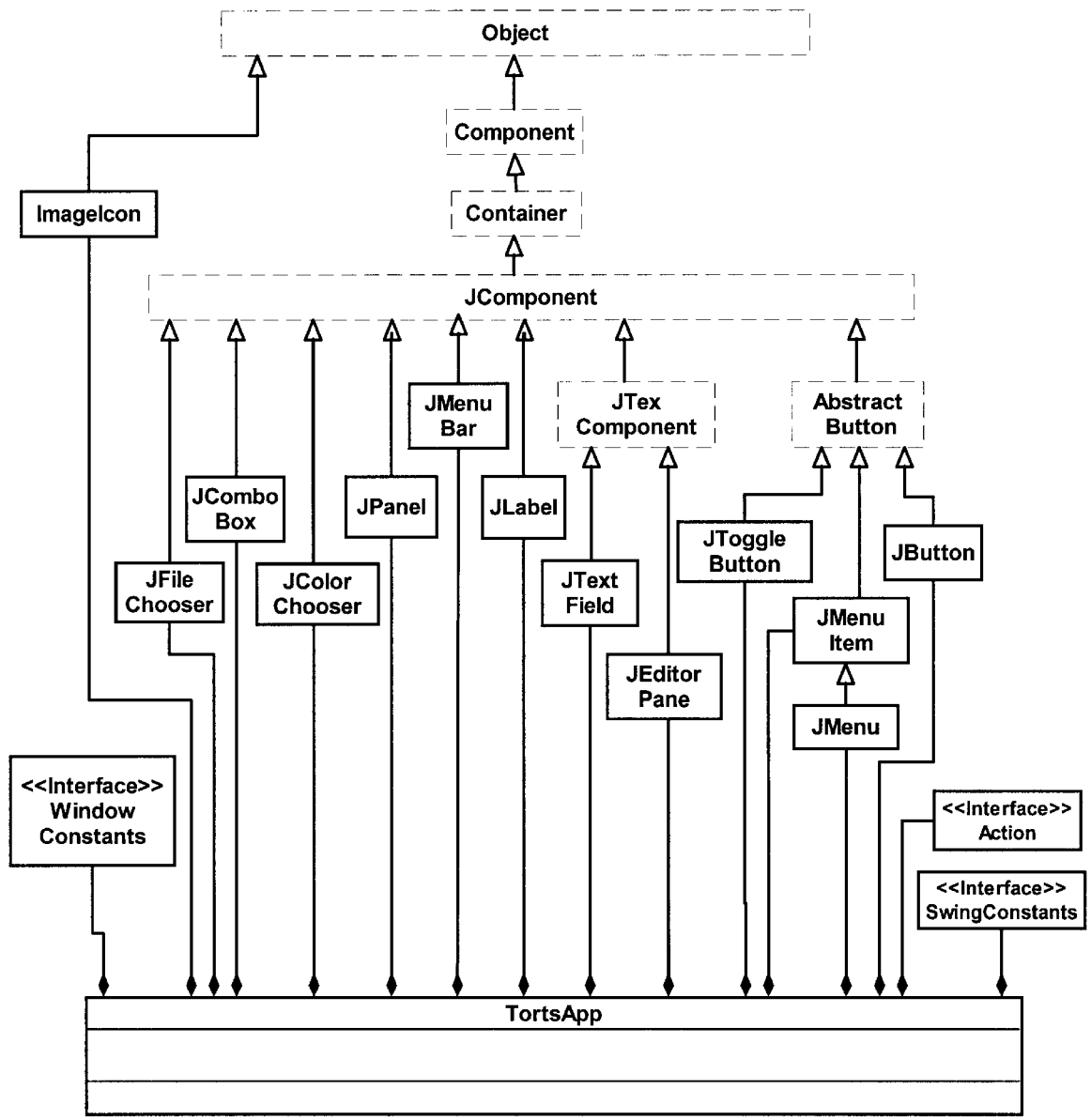
Figure 13J:
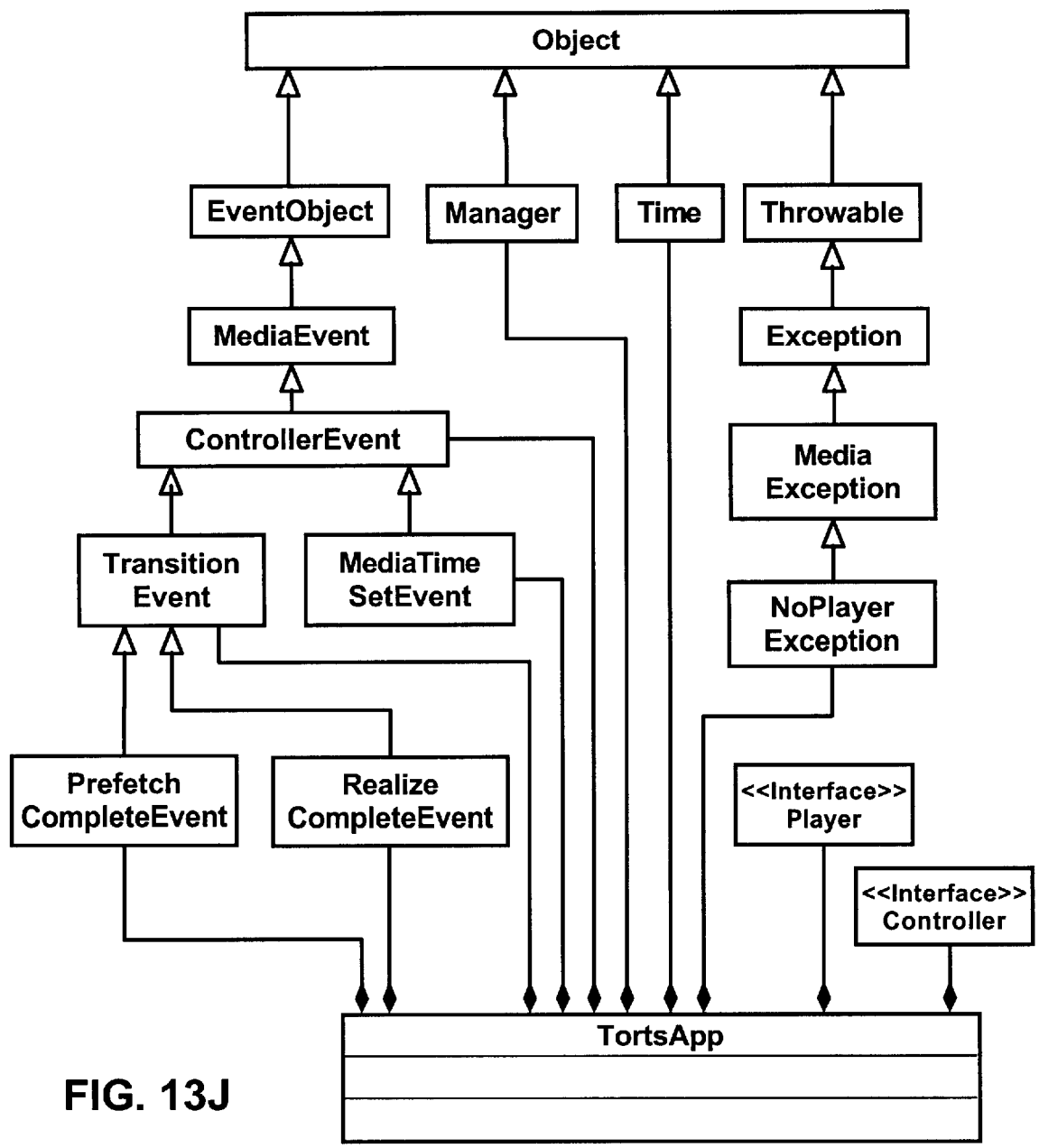

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13G:

ImageIcon
JFileChooser
JComboBox
JColorChooser
JPanel
JMenuBar
JLabel
JTextField
JEditorPane
JToggleButton
JMenuItem
JButton
Jmenu And the following interfaces:

WindowConstants
Action
SwingConstants

The above classes and interfaces are a part of the standard Java language and may be found within the javax.swing package.

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13H:

SimpleAttributeSet
StyleConstants
BadLocationException

And the following interface:

MutableAttributeSet

The above classes are a part of the standard Java language and may be found within the javax.swing.text package.

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13I:

HTMLEditorKit
HTMLDocument

The above classes are a part of the standard Java language and may be found within the java.swing.text.html package.

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13C:

HashTable
Vector
LinkedList
StringTokenizer
NoSuchElementException

The above classes are a part of the standard Java language and may be found within the java.util package.

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13D:

URL
MalformedURLException

The above classes are a part of the standard Java language and may be found within the java.net package.

FIG. 13 provides a written description in diagrammatic form of the dependencies and interrelationships among the indicated Java language classes that are functionally incorporated into the implementation of the TortsApp class, specifically including the following Java classes shown within solid-line boxes of FIG. 13B:

IOException
FileInuptStream
FileOutputStream
File
FileWriter
InputStreamReader
RandomAccessFile The above classes are a part of the standard Java language and may be found within the java.io package.

FIG. 13 provides a written description in diagrammatic form of the dependencies and interrelationships among the indicated Java Media Frameworks classes that are functionally incorporated into the implementation of the TortsApp class, specifically including the following Java Media Frameworks classes shown within solid-line boxes of Fig. J:

ControllerEvent
TransitionEvent
MediaTimeSetEvent
PrefetchCompleteEvent
RealizeCompleteEvent
Manager
Time
NoPlayerException And the following interfaces:

Player
Controller

The above classes and interfaces are a part of the Java Media Frameworks package available from Sun Microsystems and may be found within the java.media package.

Delivery Software

In the prototype embodiment of the present invention, delivery of the completed educational presentations was conducted on a university intranet corresponding to network 55 in FIG. 7. A Silicon Graphics Origin 200 server (54, FIG. 7) running the Silicon Graphics IRIX operating system (a UNIX variant) was utilized to deliver the completed presentations to students enrolled in a graduate level law course who took the course by means of networked computer stations 57 as shown in FIG. 7. The server was equipped with a widely-available software package called "Samba" to facilitate sharing of the program files, between the server and several Windows NT workstations. Samba allows computer workstations running variants of the Microsoft Windows operating system to access files stored on servers running variants of the UNIX operating system.

Each Microsoft Windows workstation (57, FIG. 7) was equipped with a special Java multimedia player to play back the audiovisual component of the educational presentation (frame 63, FIG. 8B) and synchronize all other content by reading and interpreting the script corresponding to the selected presentation frames 61, 64 and 65 in FIG. 8B). As previously described, the incorporated Appendix B includes with the "Client" folder the executable code used to deliver the prototype educational program to students over the university intranet. Students selected one of the 27 lectures by visiting a standard World Wide Web page and choosing a hyperlink that identified the desired presentation. Selecting the hyperlink loaded a web page that initially presented a display similar to that shown in FIG. 8A. The video frame 63 of the indicated web page contained the Java player as an embedded program. In addition to loading the web page and player, the student's selection of the hyperlink indicated to the system which lecture was to be displayed. Thus, after a brief delay, the video frame 63 (FIG. 8) displayed the first frame of the selected presentation.

As previously described, the students navigated through the educational presentation by utilizing playback controls similar to those shown in FIG. 8C. The play button 70 initiated playback of the presentation. The pause/stop button 71 paused the playback of the educational presentation when clicked. The fast forward and rewind buttons (72 and 73 respectively) move forward or backward within the current presentation by a predetermined amount of time (10 seconds) per click. The audio slider 74 allowed students to adjust the audio to a desired level. The position slider 75 gave the students a graphical presentation of their relative position within the lecture. By clicking and dragging the slider, students were able to locate and replay selected presentations. From the perspective of the student/user, the educational experience enjoyed through the use of the present invention is the functional equivalent of attending a live lecture with the added advantages of: sitting in the front row; controlling the rate at which the lecture is delivered; controlling the sound level; deciding the times of day during which the lecture will be attended; experiencing supplemental images, diagrams, quotations, movie clips, sounds and other related content in synchronization with the lecture; receiving concise conceptual summaries and definitions in synchronization with the lecture content; receiving continuously updated notification of the topic and subtopics being presented in the lecture; avoiding the need for a separate note pad or computer to take and store lecture notes; having the ability to selectively copy key concepts and definitions from the lecture directly into the lecture notes; and, avoiding the need to travel to the site of an unsupplemented live lecture delivered on a pre-determined schedule over a limited period of time.

While the invention has been described in conjunction with an actual prototype embodiment, together with variations on this embodiment, it will be understood by those skilled in the related technologies that there are many alternative ways to carry out the claimed methods and to embody the claimed structures; accordingly, it is expressly intended that all such alternatives, equivalents and variations be encompassed within the scope of the following claims.

APPENDIX A

Application: "Method and Apparatus for the Production and Integrated Delivery of Educational Content in Digital Form"
Inventor: Sam Sutton
Serial No.:
Filed: Herewith

Section 1 – Part A:

```
public static void main (String args[])
{
   new TortsApp().show ();
}
```

Section 1 – Part B:

```
public TortsApp()
{
   initComponents ();
   pack ();
   initEditorPanels();
   eventList = new Vector(20,20);
}
```

Section 1 – Part C:

```
private void initComponents ()
{
      // Note - the following code sample represents the creation
      // of a single component of the LectureMaker interface
      // shown in Fig. 5A and that component's subsequent
      // addition to the overall layout also shown in Fig. 5A.
      // The remaining components of the interface are
      // of well-known standard Java types and are created and
      // attached to the interface in a similar manner.

PresentationPane = new javax.swing.JEditorPane ();
      PresentationPane.setDoubleBuffered (true);
      PresentationPane.addMouseListener (new
java.awt.event.MouseAdapter () {
            public void mousePressed (java.awt.event.MouseEvent evt)
            {
                PresentationPaneMousePressed (evt);}
            }
      );

getContentPane ().add (PresentationPane, new
org.netbeans.lib.awtextra.AbsoluteConstraints (320, 50, 704,
540));
}
```

Section 1 – Part D:

```
    private void initEditorPanels()
    {
        TitlePane.setContentType("text/html");
        ConceptsPane.setContentType("text/html");
        PresentationPane.setContentType("text/html");

TitlePane.setEditorKit(kit);
        ConceptsPane.setEditorKit(kit);
        PresentationPane.setEditorKit(kit);

commands = new Hashtable();
        actions = kit.getActions();
        for (int i = 0; i < actions.length; i++)
        {
            Action a = actions[i];
            commands.put(a.getValue(Action.NAME), a);
        } fontSizeList = new java.util.LinkedList();
        StringBuffer hashKey = new StringBuffer();
        for ( int i = 0; i<150; i++ )
        {
          hashKey.delete(0,hashKey.length());
          hashKey.append("font-size-");
          hashKey.append(i);
          if (commands.containsKey(hashKey.toString()))
          {
            fontSizeList.add(Integer.toString(i));
            FontSizeComboBox.addItem(fontSizeList.getLast());
          }
        }

Object[] hashKeyArray = commands.keySet().toArray();
        fontFamilyList = new java.util.LinkedList();
        for ( int i=0; i<commands.keySet().size(); i++ )
        {
          if ( hashKeyArray[i].toString().startsWith("font-family-") )
          {
            fontFamilyList.add(hashKeyArray[i].toString());
            FontFamilyComboBox.addItem(fontFamilyList.getLast());
          }
        }

BoldButton.addActionListener((Action)commands.get("font-bold"));
        CenterButton.addActionListener((Action)commands.get("center-justify"));
        LeftButton.addActionListener((Action)commands.get("left-justify"));
        ItalicButton.addActionListener((Action)commands.get("font-italic"));
        UnderlineButton.addActionListener((Action)commands.get("font-underline"));
```

A-2

```
        BiggerTextButton.addActionListener( new ActionListener()
        {
          public void actionPerformed(ActionEvent ae)
          {
            MutableAttributeSet attr = kit.getInputAttributes();
            int fontSize =
StyleConstants.CharacterConstants.getFontSize(attr);
            try
            {
              fontSize =
Integer.parseInt(fontSizeList.get(fontSizeList.indexOf(Integer.toString(
fontSize)) + 1).toString());
              StyleConstants.CharacterConstants.setFontSize(attr,
fontSize);
            }
            catch (IndexOutOfBoundsException ioobe)
            {
            } if ((JEditorPane)getFocusOwner() == PresentationPane)
            {
              int selectionStart  =
PresentationPane.getSelectionStart();
              int selectionEnd    = PresentationPane.getSelectionEnd();
              int selectionLength = selectionEnd - selectionStart;
              HTMLDocument currentDoc =
(HTMLDocument)PresentationPane.getDocument();
              currentDoc.setCharacterAttributes(selectionStart,
selectionLength, attr, true);
            }
            else if ((JEditorPane)getFocusOwner() == ConceptsPane)
            {
              int selectionStart  = ConceptsPane.getSelectionStart();
              int selectionEnd    = ConceptsPane.getSelectionEnd();
              int selectionLength = selectionEnd - selectionStart;
              HTMLDocument currentDoc =
(HTMLDocument)ConceptsPane.getDocument();
              currentDoc.setCharacterAttributes(selectionStart,
selectionLength, attr, true);
            }
            else if ((JEditorPane)getFocusOwner() == TitlePane)
            {
              int selectionStart  = TitlePane.getSelectionStart();
              int selectionEnd    = TitlePane.getSelectionEnd();
              int selectionLength = selectionEnd - selectionStart;
              HTMLDocument currentDoc =
(HTMLDocument)TitlePane.getDocument();
              currentDoc.setCharacterAttributes(selectionStart,
selectionLength, attr, true);
            }
          }
        }
        );
```

Section 1 – Part E:

```
  private void openvideoButtonActionPerformed
(java.awt.event.ActionEvent evt)
{
    JFileChooser fileDialog = new JFileChooser();
    fileDialog.setDialogTitle("Select Movie to Open...");
    fileDialog.addChoosableFileFilter(new VideoFilter());
    fileDialog.setFileView(new VideoFileView());
    int rv = fileDialog.showOpenDialog(this);
    File videoFile = fileDialog.getSelectedFile();

if (rv == fileDialog.APPROVE_OPTION)
    {
      int i = videoFile.getName().lastIndexOf('.');
      if (i > 0 )
      {
        lecturePath = new File ( videoFile.getName().substring(0, i));
      }
      if ( !lecturePath.exists() )
      {
        lecturePath.mkdirs();
        System.out.println("Lecture Path = " + lecturePath);
      }
      htmlPath = new File ( lecturePath.getAbsolutePath() + "\\html" );
      if ( !htmlPath.exists() )
      {
        htmlPath.mkdirs();
      }
      contentPath = new File ( lecturePath.getAbsolutePath() +
"\\content" );
      if ( !contentPath.exists() )
      {
        contentPath.mkdirs();
      } scriptFile = lecturePath.getAbsolutePath() + "\\" +
videoFile.getName().substring(0,i) + ".script";
      setupVideoPlayer(videoFile);
    }
  }
```

Section 1 – Part F:

```
private void setupVideoPlayer(File videoFile)
    {
        URL myURL = null;
        try { myURL = new URL("file:" + videoFile.getPath()); }
        catch (MalformedURLException e) { }
        try
        {
            myPlayer = Manager.createPlayer(myURL);
            myPlayer.addControllerListener(this);
            myPlayer.realize();
        }
        catch (IOException e)
```

```
        {
            System.out.println("I/O problem attempting to create
player...exiting");
            System.exit(1);
        }
        catch (NoPlayerException e)
        {
            System.out.println("No usable Player returned...exiting");
            System.exit(1);
        }
    }
```

Section 1 – Part G:
```
public synchronized void controllerUpdate(ControllerEvent event)
    {
        if (event instanceof RealizeCompleteEvent)
           myPlayer.prefetch();
        else if (event instanceof PrefetchCompleteEvent)
        {
            if (visual != null)
            return;
            if ((visual = myPlayer.getVisualComponent()) != null)
            {
                Dimension size = visual.getPreferredSize();
                videoWidth = size.width;
                videoHeight = size.height;
                Panel visualPanel = new Panel();
                visualPanel.add(visual);
                VideoPanel.add(visualPanel, new
org.netbeans.lib.awtextra.AbsoluteConstraints (0, 0, 320, 240));
            }
            if ((control = myPlayer.getControlPanelComponent()) != null)
            {
                controlHeight = control.getPreferredSize().height;
                control.setSize ( controlWidth, controlHeight);
                ButtonPanel.add (control, new
org.netbeans.lib.awtextra.AbsoluteConstraints (0, 75,
ButtonPanel.getWidth(), 75 + controlHeight));
            }
            VideoPanel.setSize(videoWidth, videoHeight);
            validate();

initializeScripting();

controllerThread = new Thread(this);
            controllerThread.start();
        }
        else if (event instanceof MediaTimeSetEvent)
        {
            flipFrames(myPlayer.getMediaTime().getSeconds());
            controllerThread.interrupt();
        }
        else if (event instanceof TransitionEvent)
        {
            if (myPlayer.getState() == myPlayer.Started)
            {
```

```
            videoPlayerPlay();
        }
    }
}
```

Section 1 – Part H:
```
public synchronized void run()
    {
        while (true)
        {
           i = 0;
           interrupted = false;

if ((myPlayer.getState() != myPlayer.Started) && (threadState ==
NORMAL))
           {
               try { wait(0); } catch (InterruptedException ie) { }
           } try { lastTimeElement =
((eventObject)eventList.lastElement()).timeIndex; }
           catch (NoSuchElementException nse) { lastTimeElement = 0.0; } seconds = (myPlayer.getMediaTime()).getSeconds();

if ((seconds >= lastTimeElement) && (threadState == NORMAL))
           {
               try { wait(0); } catch (InterruptedException ie) { }
           }
           else if (threadState == NORMAL)
           {
               while (seconds >
((eventObject)eventList.elementAt(i)).timeIndex)
               {
                   i++;
               }
               sleepms = java.lang.Math.abs((long)(seconds -
((eventObject)eventList.elementAt(i)).timeIndex)) * 1000;
               if (sleepms == 0)
               {
                  sleepms = 100;

try { wait(sleepms); }
                  catch (InterruptedException ie) { interrupted = true;}
               }
               else
               {
                  try { wait(sleepms); }
                  catch (InterruptedException ie) { interrupted = true;} if ((!interrupted) && (myPlayer.getState() ==
myPlayer.Started))
                  {
                      eventObject ev = (eventObject)eventList.elementAt(i);
                      updateFrame(ev);
                  }
```

A-6

```
                try
                {
                    seconds = (myPlayer.getMediaTime()).getSeconds();
                    double nextSecond =
((eventObject)eventList.elementAt(++i)).timeIndex;

while (nextSecond - seconds < 0.5)
                    {
                        eventObject ev =
(eventObject)eventList.elementAt(i);

updateFrame(ev);
                        nextSecond =
((eventObject)eventList.elementAt(++i)).timeIndex;
                    }
                }
                catch (ArrayIndexOutOfBoundsException aobe) { }
            }
        }
        if (threadState == SHUTDOWN)
        {
            break;
        }
    }
}
```

Section 1 – Part I:
```
public synchronized void addEvent(String frameName, double startTime,
double stopTime)
{
    int i = 0;

eventObject ev = new eventObject();
    ev.frameTitle = frameName;
    ev.timeIndex  = startTime;
    //this is the video cut stop event
    ev.correspondingEventTime = stopTime;

try
    {
        while (ev.timeIndex >
((eventObject)eventList.elementAt(i)).timeIndex)
            i++;
    }
    catch (ArrayIndexOutOfBoundsException aibe) { } eventList.insertElementAt(ev, i);
    writeEventList();
    notify();
}
```

Section 1 – Part J:
```
public synchronized int deleteEvent(String frameName)
{
    int i = 0, eventLocation = 0;
    eventObject previousEvent = null;
```

A-7

```
        double seconds = (myPlayer.getMediaTime()).getSeconds();

try
    {
        while (seconds >=
((eventObject)eventList.elementAt(i)).timeIndex)
        {
            if
((((eventObject)eventList.elementAt(i)).frameTitle.compareToIgnoreCase(f
rameName) == 0))
            {
                previousEvent = (eventObject)eventList.elementAt(i);
                eventLocation = i;
            }
            i++;
        }
    }
    catch (ArrayIndexOutOfBoundsException aibe) { } if (previousEvent != null)
    {
        eventList.remove(eventLocation);
        if (previousEvent.frameFile != null)
            previousEvent.frameFile.delete();
        writeEventList();
    }
    eventLocation--;
    return eventLocation;
}
```

Section 1 – Part K:
```
public synchronized void changeEvent(String frameName)
{
    int i = 0, eventLocation = 0;
    eventObject previousEvent = null;
    double seconds = (myPlayer.getMediaTime()).getSeconds();

try
    {
        while (seconds >=
((eventObject)eventList.elementAt(i)).timeIndex)
        {
            if
((((eventObject)eventList.elementAt(i)).frameTitle.compareToIgnoreCase(f
rameName) == 0))
            {
                previousEvent = (eventObject)eventList.elementAt(i);
                eventLocation = i;
            }
            i++;
        }
    }
    catch (ArrayIndexOutOfBoundsException aibe) { } if (previousEvent != null)
    {
```

A-8

```
      try
      {
         String filename = previousEvent.frameFile.toString();
         if (filename.endsWith(blankPresentationFile.getName()) ||
filename.endsWith(blankKeyconceptsFile.getName()) ||
             filename.endsWith(blankTitleFile.getName()) )
         {
            System.out.println("Can't change default blank file: " +
filename);
         }
         else
         {
            previousEvent.frameFile.delete();
            FileWriter outputFile = new FileWriter( filename );
            if ( frameName.compareToIgnoreCase("TitleFrame") == 0 )
            {
               kit.write(outputFile, TitlePane.getDocument(), 0,
(TitlePane.getDocument()).getLength() );
               outputFile.flush();
            }
            else if ( frameName.compareToIgnoreCase("PresentationFrame")
== 0 )
            {
               kit.write(outputFile, PresentationPane.getDocument(), 0,
(PresentationPane.getDocument()).getLength() );
               outputFile.flush();
            }
            else if ( frameName.compareToIgnoreCase("ConceptFrame") == 0 )
            {
               kit.write(outputFile, ConceptsPane.getDocument(), 0,
(ConceptsPane.getDocument()).getLength() );
               outputFile.flush();
            }
         }
      }
      catch (IOException ioe) { }
      catch (BadLocationException ble) { }
   }
}
```

Section 1 – Part L:
```
private void updateFrame(eventObject ev)
{
    InputStreamReader in = null;

if (ev.frameTitle.compareToIgnoreCase(presentationFrameTitle) == 0)
    {
        try { (PresentationPane.getDocument()).remove(0,
(PresentationPane.getDocument()).getLength()); }
        catch (BadLocationException ble) { } try
        {
            in = new InputStreamReader(new
FileInputStream(ev.frameFile.toString()));
            kit.read(in, PresentationPane.getDocument(), 0);
```

```
            }
            catch (IOException ioe) { System.out.println("(updateFrame) File
Not Found - " + ev.frameFile.toString()); }
            catch (BadLocationException ble) { }
            PresentationPane.repaint();
        }
        else if (ev.frameTitle.compareToIgnoreCase(keyConceptFrameTitle) ==
0)
        {
            try { (ConceptsPane.getDocument()).remove(0,
(ConceptsPane.getDocument()).getLength()); }
            catch (BadLocationException ble) { } try
            {
                in = new InputStreamReader(new
FileInputStream(ev.frameFile.toString()));
                kit.read(in, ConceptsPane.getDocument(), 0);
            }
            catch (IOException ioe) { System.out.println("(updateFrame) File
Not Found - " + ev.frameFile.toString()); }
            catch (BadLocationException ble) { }
            ConceptsPane.repaint();
        }
        else if (ev.frameTitle.compareToIgnoreCase(titleFrameTitle) == 0)
        {
            try { (TitlePane.getDocument()).remove(0,
(TitlePane.getDocument()).getLength()); }
            catch (BadLocationException ble) { } try
            {
                in = new InputStreamReader(new
FileInputStream(ev.frameFile.toString()));
                kit.read(in, TitlePane.getDocument(), 0);
            }
            catch (IOException ioe) { System.out.println("(updateFrame) File
Not Found - " + ev.frameFile.toString()); }
            catch (BadLocationException ble) { }
            TitlePane.repaint();
        }
        else if (ev.frameTitle.compareToIgnoreCase(videoFrameTitle) == 0)
        {
            myPlayer.setMediaTime(new
javax.media.Time(ev.correspondingEventTime) );
        }
    }
}
```

Section 2:

```
        import java.io.File;
        import java.net.URL;
        public class eventObject extends Object
        {
           double timeIndex;
           String frameTitle;
```

```
        File    frameFile;
        double  correspondingEventTime;
}
```

Section 3:

```java
import java.io.File;
import java.net.URL;

public class videoEventObject extends Object
{
    double startTimeIndex;
    double stopTimeIndex;
    File   videoFile;
}
```

Section 4:

```java
import java.io.File;

public class Utils
{
  public final static String jpeg = "jpeg";
  public final static String jpg  = "jpg";
  public final static String gif  = "gif";
  public final static String tiff = "tiff";
  public final static String tif  = "tif";
  public final static String mpg  = "mpg";
  public final static String mpeg = "mpeg";
  public final static String htm  = "htm";
  public final static String html = "html";

public static String getExtension ( File f )
  {
    String ext = null;
    String s = f.getName();
    int i = s.lastIndexOf('.');
    if (i > 0 &&  i < s.length() - 1)
    {
       ext = s.substring(i+1).toLowerCase();
    }
    return ext;
  }
}
```

Section 5:

```java
import java.io.File;
import javax.swing.*;
import javax.swing.filechooser.*;

public class ImageFilter extends FileFilter
```

```
            {
        public boolean accept(File f)
        {
            if (f.isDirectory())
            {
                return true;
            }
            String extension = Utils.getExtension(f);
            if (extension != null)
            {
                if (extension.equals(Utils.tiff) ||
                    extension.equals(Utils.tif) ||
                    extension.equals(Utils.gif) ||
                    extension.equals(Utils.jpeg) ||
                    extension.equals(Utils.jpg))
                  return true;
            }
            else
            {
                return false;
            }
        }
        return false;
    } public String getDescription()
    {
        return "Images";
    }
}
```

Section 6:

```
import java.io.File;
import javax.swing.*;
import javax.swing.filechooser.*;

public class VideoFilter extends FileFilter
{
  public boolean accept(File f)
  {
    if (f.isDirectory())
    {
      return true;
    }
    String extension = Utils.getExtension(f);
    if (extension != null)
    {
      if ( extension.equals(Utils.mpg) ||
extension.equals(Utils.mpeg))
      {
        return true;
      }
      else
      {
```

```
        return false;
      }
    } return false;
  } public String getDescription()
  {
    return "Video Files";
  }
}
```

Section 7:

```
import java.io.File;
import javax.swing.*;
import javax.swing.filechooser.*;

public class HTMLFilter extends FileFilter
{
    public boolean accept(File f)
    {
      if (f.isDirectory())
      {
        return true;
      }
      String extension = Utils.getExtension(f);
      if (extension != null)
      {
         if (extension.equals(Utils.htm) ||
extension.equals(Utils.html))
         {
           return true;
         }
         else
         {
           return false;
         }
      }
      return false;
    } public String getDescription()
    {
      return "HTML Files";
    }
}
```

Section 8:

```
import javax.swing.*;
import java.beans.*;
import java.awt.*;
```

```
import java.io.File;

public class ImagePreview extends Jcomponent implements
PropertyChangeListener {
    ImageIcon thumbnail = null;
    File file = null;

public ImagePreview(JFileChooser fc)
    {
        setPreferredSize(new Dimension(100, 50));
        fc.addPropertyChangeListener(this);
    } public void loadImage()
    {
        if (file == null)
        {
            return;
        }

ImageIcon tmpIcon = new ImageIcon(file.getPath());
        if (tmpIcon.getIconWidth() > 90)
        {
            thumbnail = new
ImageIcon(tmpIcon.getImage().getScaledInstance(90, -
1,Image.SCALE_DEFAULT));
        } else
        {
            thumbnail = tmpIcon;
        }
    } public void propertyChange(PropertyChangeEvent e)
    {
        String prop = e.getPropertyName();
        if
(prop.equals(JFileChooser.SELECTED_FILE_CHANGED_PROPERTY))
        {
            file = (File) e.getNewValue();
            if (isShowing())
            {
                loadImage();
                repaint();
            }
        }
    } public void paintComponent(Graphics g)
    {
        if (thumbnail == null)
        {
            loadImage();
        }
        if (thumbnail != null)
        {
            int x = getWidth()/2 - thumbnail.getIconWidth()/2;
            int y = getHeight()/2 - thumbnail.getIconHeight()/2;
```

A-14

```
                if (y < 0)
                {
                    y = 0;
                }
                if (x < 5)
                {
                    x = 5;
                }
                thumbnail.paintIcon(this, g, x, y);
            }
        }
    }
```

Section 9:

```
        import java.io.File;
        import javax.swing.*;
        import javax.swing.filechooser.*;

public class VideoFileView extends FileView
        {
          ImageIcon mpgIcon = new ImageIcon("images/mpgIcon.gif");

public String getName(File f)
          {
            return null;
          } public String getDescription(File f)
          {
            return null;
          } public Boolean isTraversable(File f)
          {
            return null;
          } public String getTypeDescription(File f)
          {
            String extension = Utils.getExtension(f);
            String type = null;

if (extension != null)
            {
              if ( extension.equals(Utils.mpg) ||
        extension.equals(Utils.mpeg))
                {
                  type = "MPEG Video";
                }
            }
            return type;
          }
```

```
      public Icon getIcon(File f)
      {
        String extension = Utils.getExtension(f);
        Icon icon = null;

if (extension != null)
        {
           if (extension.equals(Utils.mpeg) ||
    extension.equals(Utils.mpg))
           {
              icon = mpgIcon;
           }
        }
        return icon;
      }
    }
```

Section 10:

```
    import java.io.File;
    import javax.swing.*;
    import javax.swing.filechooser.*;

public class ContentFileView extends FileView
    {
      ImageIcon jpgIcon = new ImageIcon("images/jpgIcon.gif");
      ImageIcon gifIcon = new ImageIcon("images/gifIcon.gif");
      ImageIcon tiffIcon = new ImageIcon("images/tiffIcon.gif");
      ImageIcon htmlIcon = new ImageIcon("images/htmlIcon.gif");

public String getName(File f)
      {
        return null;
      } public String getDescription(File f)
      {
        return null;
      } public Boolean isTraversable(File f)
      {
        return null;
      } public String getTypeDescription(File f)
      {
        String extension = Utils.getExtension(f);
        String type = null;

if (extension != null)
        {
           if (extension.equals(Utils.jpeg) ||
    extension.equals(Utils.jpg))
```

```
          {
            type = "JPEG Image";
          }
          else if (extension.equals(Utils.gif))
          {
            type = "GIF Image";
          }
          else if (extension.equals(Utils.tiff) ||
    extension.equals(Utils.tif))
          {
            type = "TIFF Image";
          }
          else if (extension.equals(Utils.html) ||
    extension.equals(Utils.htm))
          {
            type = "HTML File";
          }
        }
        return type;
      } public Icon getIcon(File f)
      {
        String extension = Utils.getExtension(f);
        Icon icon = null;

if (extension != null)
        {
          if (extension.equals(Utils.jpeg) ||
    extension.equals(Utils.jpg))
          {
            icon = jpgIcon;
          }
          else if (extension.equals(Utils.gif))
          {
            icon = gifIcon;
          }
          else if (extension.equals(Utils.tiff) ||
    extension.equals(Utils.tif))
          {
            icon = tiffIcon;
          }
          else if (extension.equals(Utils.html) ||
    extension.equals(Utils.htm))
          {
            icon = htmlIcon;
          }
        }
        return icon;
      }
    }
```

Section 11:

```
import java.io.File;
```

```java
import javax.swing.*;
import javax.swing.filechooser.*;

public class HTMLFileView extends FileView
{
  ImageIcon HTMLIcon = new ImageIcon("images/htmlIcon.gif");

public String getName(File f)
  {
    return null;
  } public String getDescription(File f)
  {
    return null;
  } public Boolean isTraversable(File f)
  {
    return null;
  } public String getTypeDescription(File f)
  {
    String extension = Utils.getExtension(f);
    String type = null;

if (extension != null)
    {
      if (extension.equals(Utils.htm) || extension.equals(Utils.html))
      {
        type = "HTML File";
      }
    }
    return type;
  } public Icon getIcon(File f)
  {
    String extension = Utils.getExtension(f);
    Icon icon = null;

if (extension != null)
    {
      if (extension.equals(Utils.htm) || extension.equals(Utils.html))
      {
        icon = HTMLIcon;
      }
    }
    return icon;
  }
}
```

A-18

What is claimed is:

1. Apparatus for producing a multimedia educational program in digital form, including:
   (a) means for capturing and storing as time-based digital performance files the sounds, actions or events produced by at least one person involved in the rendition of an informational presentation over a period of time;
   (b) means for compiling and storing as digital content files a plurality of informational expressions related in subject matter and sequence to selected time segments within said performance files;
   (c) means for generating a screen having multiple predetermined and functionally independent frames including (i) a first frame to receive and display a selected performance file depicting at least a portion of said informational presentation and (ii) supplemental frames to separately receive and display selected content files in a defined order and in defined synchronization relative to the display of the selected performance file in said first frame;
   (d) means for displaying a selected performance file within said first frame while entering selected content files, in said defined order and synchronization, for display within selected supplemental frames of said screen; and,
   (e) means for generating and storing as digitally-readable script files, time-based records of when each selected content file is displayed in each of the supplemental frames in chronological relating to the display of the selected performance file in said first frame.

2. The apparatus of claim 1 wherein the means (d) and (e) initially function on an approximately concurrent basis in the production of said digital program.

3. Apparatus for receiving and displaying a multimedia program produced by the apparatus of claim 1, including at the site of an independent user:
   means for receiving said performance and content files;
   means for generating a screen having multiple predetermined and functionally independent frames including (i) a first display frame to receive and display a time-based digital performance file and (ii) supplemental display frames to separately receive and display selected content files;
   means for displaying a selected time-based performance file within said first frame and selectively displaying corresponding content files in the predetermined order and synchronization defined by the digital entries stored in said script files.

4. Apparatus for producing a multimedia educational program in digital form, including:
   (a) audio, video and computer-based hardware to capture and store as time-based digital performance files the sounds, actions and events produced by at least one person involved in the rendition of an educational presentation over a period of time;
   (b) computer-based hardware to compile and store as digital content files a plurality of informational expressions related in subject matter to selected time segments within said performance files;
   (c) computer-based hardware to generate a screen having multiple predetermined and functionally independent frames including (i) a first frame to receive and display a selected performance file depicting at least a portion of said educational presentation and (ii) a plurality of supplemental frames to separately receive and display selected content files in a defined order and in defined synchronization relative to the display of the selected performance file in said first frame;
   (d) computer-based hardware to display a selected performance file within said first frame while entering selected content files, in said defined order and synchronization, for display within selected supplemental frames of said screen; and,
   (e) computer-based hardware to generate and store as digitally-readable script files, time-based records of when each selected content file is displayed in each of the plurality of supplemental frames in chronological relation to the display of the selected performance file in said first frame.

5. The apparatus of claim 4 wherein hardware elements (d) and (e) are initially operated on an approximately concurrent basis in the production of said digital program.

6. Apparatus for receiving and displaying a multimedia educational program produced by the apparatus of claim 4, including at the site of an independent user:
   computer-based hardware to receive and at least temporarily store said performance and content files;
   computer-based hardware to generate a screen having multiple predetermined and functionally independent frames including (i) a first display frame to receive and display a time-based digital performance file and (ii) a plurality of supplemental display frames to separately receive and display selected content files;
   computer-based hardware, controlled by and responsive to said digital script files, to display a selected time-based performance file within said first frame while selecting and displaying corresponding content files in the predetermined order and synchronization defined by said script files.

7. A computer-implemented multimedia presentation for display on a digital monitor, comprising in combination:
   (a) a screen having predetermined frames for independently receiving and displaying digital files on said monitor;
   (b) a time-based performance file including digital audio and video content for display in a first of said predetermined frames;
   (c) digital content files for display in a second of said predetermined frames;
   (d) digital content files for display in a third of said predetermined frames;
   (e) digitally-readable script files for controlling the computer-implemented selection and display of said digital content files in chronological response to the display of said time-based performance file.

8. The computer-implemented presentation of claim 7, further including:
   (e) digital content files for display in a fourth of said predetermined frames.

9. The computer-implemented presentation of claim 8 wherein
   the digital content files displayed in said second frame are selected from the group consisting of graphic, text, video, audio, and interactive content files; and,
   the digital content files displayed in the third and fourth frames are text-based content files.

10. The computer-implemented presentation of claim 9 wherein
    the digital files displayed in the second frame selectively supplement the content within concurrently displayed segments of the time-based performance file;

the digital files displayed in the third frame selectively summarize the conceptual content within concurrently displayed segments of the time-based performance file; and, the digital files displayed in the fourth frame selectively identify the topical content within the concurrently displayed segments of the time-based performance file.

11. A method for producing a multimedia presentation for display on a digital monitor, including the steps of:

(a) generating on said monitor a screen having multiple independent frames of fixed configuration for separately receiving and displaying digital files;

(b) selecting and storing a time-based performance file having digital audio and video elements for display in a first of said frames over a predetermined period of time;

(c) selecting and storing a plurality of digital content files for separate display in a second of said frames beginning at different selected times during the display of said performance file in the first frame;

(d) selecting and storing a plurality of digital content files for separate display in a third of said frames beginning at different times during the display of said performance file in the first frame;

(e) generating and storing as digitally-readable script files, time-based records of when selected digital content files are displayed in each of the second and subsequent frames in chronological relation to the display of the selected performance file in the first frame.

12. The method of claim 11 including the intermediate step of:

selecting and storing a plurality of digital content files for separate display in a fourth of said frames beginning at different times during the display of said performance file in the first frame.

13. A method for displaying a multimedia presentation on a computer controlled monitor having a screen with multiple predefined and functionally independent frames for receiving and displaying digital files, said method including the steps of:

(a) storing at least portions of a time-based performance file having digital audio and video elements for sequential display in a first of said frames over a predetermined period of time;

(b) storing on at least a temporary basis digital content files for separate display in a second of said frames commencing at different predetermined times during the display of said performance file in the first frame;

(c) storing on at least a temporary basis digital content files for separate display in a third of said frames commencing at different predetermined times during the display of said performance file in the first frame; and, (d) displaying the performance file in the first frame while selectively displaying the digital content files in the second and subsequent frames in controlled response to digitally-readable script files, comprising time-based records of when each digital content file is displayed in each of the second and subsequent frames in chronological relation to the display of the performance file in the first frame.

14. The method of claim 13 wherein the storing and displaying steps are executed on the same computer.

15. The method of claim 13 wherein the storing and displaying steps are executed on different computers.

16. The method of claim 13 further including the intermediate step of:

storing a plurality of digital content files for separate display in a fourth of said frames commencing at different predetermined times during the display of said performance file in the first frame.

17. A method for producing and delivering an educational program in digital form, including the steps of:

(a) capturing and storing as time-based digital performance files the sounds, actions and events produced by at least one person involved in the rendition of an educational presentation over a period of time;

(b) compiling and storing as digital content files a plurality of informational expressions related in subject matter to selected time segments within said educational presentation;

(c) generating a screen having multiple predetermined and functionally independent frames including (i) a first frame for receiving and displaying at least one performance file depicting said educational presentation and (ii) a plurality of supplemental frames for separately receiving and displaying selected content files in a defined order and in defined synchronization relative to the display of said performance file in said first frame;

(d) displaying at least one of said time-based performance files within said first frame while selectively entering said content files, in said defined order and synchronization, for display within selected supplemental frames of said screen; and (e) generating and storing as digitally-readable script files, time-based records of when selected content files are displayed in each of the plurality of supplemental frames in chronological relation to the display of a selected performance file in said first frame.

18. The method of claim 17 wherein step (e) is performed approximately concurrently with an initial performance of step (d).

19. The method of claim 18 wherein steps (d) and (e) are repeated while the at least one content file is added or modified and a corresponding script file is generated to incorporate said modification into the educational program for subsequent delivery to users.

20. An educational program in digital form produced by the method of claim 19.

21. An educational program in digital form produced by the method of claim 18.

22. The method of claim 17 including the subsequent repeated performance of step (c) followed by the repeated performance of all or part of step (d) in controlled response to the previously generated digitally-readable script files.

23. The method of claim 22 wherein at least one subsequent repetition of step (d) is performed in response to a command from an independent user before said frames and their contents are displayed on the user's separately generated screen.

24. The method of claim 23 wherein a repetition of step (d) is initiated in response to the transmission of at least one authorization file from a remote site to the location of the independent user.

25. The method of claim 24 wherein the repetition of step (d) is performed in substantial part in controlled response to digital information physically transported to the site of the independent user's screen.

26. The method of claim 24 wherein a repetition of step (d) is performed in substantial part in controlled response to digital information electronically transmitted to the site of the independent user's screen.

27. The method of claim 23 wherein an independent user creates and digitally stores individual files during a repetition of step (d), said individual files being related to the subject matter of at least one of the performance and content files.

28. The method of claim 27 wherein at least one portion of an individual file is displayed in a predetermined portion of the independent user's screen.

29. The method of claim 23 wherein the repetition of step (d) is performed in substantial part in controlled response to digital information physically transported to the site of the independent user's screen.

30. The method of claim 23 wherein a repetition of step (d) is performed in substantial part in controlled response to digital information electronically transmitted to the site of the independent user's screen.

31. An educational program in digital form produced by the method of claim 17.

* * * * *